United States Patent
Tung et al.

(10) Patent No.: US 7,907,658 B2
(45) Date of Patent: Mar. 15, 2011

(54) SYSTEMS AND METHODS FOR RESOLVING SIGNAL-TO-NOISE RATIO MARGIN DIFFERENCE IN DUAL LATENCY DISCRETE MULTI-TONE-BASED XDSL SYSTEMS UNDER COLORED NOISE CONDITIONS

(75) Inventors: Tai-Lai Tung, Irvine, CA (US); Mike Tu, Irvine, CA (US)

(73) Assignee: Ikanos Communications, Inc., Fremont, CA (US)

(*) Notice: Subject to any disclaimer, the term of this patent is extended or adjusted under 35 U.S.C. 154(b) by 1111 days.

(21) Appl. No.: 11/513,096

(22) Filed: Aug. 31, 2006

(65) Prior Publication Data

US 2007/0047633 A1 Mar. 1, 2007

Related U.S. Application Data

(60) Provisional application No. 60/712,435, filed on Aug. 31, 2005.

(51) Int. Cl.
*H04L 5/16* (2006.01)

(52) U.S. Cl. ........ 375/222; 375/219; 375/220; 370/272; 370/273; 370/276; 370/297; 455/39; 455/73; 725/111

(58) Field of Classification Search .................. 375/219, 375/220, 222; 455/39, 73; 370/272, 273, 370/276, 297; 725/111
See application file for complete search history.

(56) References Cited

U.S. PATENT DOCUMENTS

| | | | |
|---|---|---|---|
| 5,790,550 A * | 8/1998 | Peeters et al. ................. | 370/480 |
| 6,408,004 B1 | 6/2002 | Wetzel et al. | |
| 6,801,570 B2 | 10/2004 | Yong | |
| 7,274,734 B2 * | 9/2007 | Tsatsanis ...................... | 375/222 |
| 2002/0163983 A1 | 11/2002 | Redferm | |

OTHER PUBLICATIONS

PCT International Search Report and Written Opinion, dated Mar. 14, 2008.

* cited by examiner

*Primary Examiner* — David C Payne
*Assistant Examiner* — Leon Flores
(74) *Attorney, Agent, or Firm* — Thomas, Kayden, Horstemeyer & Risley, LLP

(57) ABSTRACT

Systems and methods for resolving signal-to-noise ratio margin difference n dual latency discrete multi-tone (DMT)-based xDSL systems under colored noise conditions. Rather than assuming a constant power spectral density (PSD) for noise over fast and interleaved data paths of a dual latency system, band edges vulnerable to colored noise are determined and data on the fast data path is allocated away from these band edges. Also, receive windowing may be used to further enhance performance.

16 Claims, 34 Drawing Sheets

DIFFERENCE OF CORRELATION BETWEEN (C) AND (W) FROM TONE 1971 TO 2500

DIFFERENCE OF CORRELATION BETWEEN (C) AND (W) FROM TONE 870 TO 1205

DETAIL RESULTS – WITH RECEIVE WINDOWING (HALF BETA = 512)
CROSS-CORRELATION FROM TONE 1971 TO 2500 FOR CROSS TALK NOISE (C)

DETAIL RESULTS – WITH RECEIVE WINDOWING (HALF BETA = 512)
CROSS-CORRELATION FROM TONE 1971 TO 2500 FOR WHITE NOISE (W)

DETAIL RESULTS – WITH RECEIVE WINDOWING (HALF BETA = 512)

DIFFERENCE OF CORRELATION BETWEEN (C) AND (W) FROM TONE 1971 TO 2500

DETAIL RESULTS – WITH RECEIVE WINDOWING (HALF BETA = 512)
CROSS-CORRELATION FROM TONE 870 TO 1205 CROSS-TALK NOISE (C)

DETAIL RESULTS – WITH RECEIVE WINDOWING (HALF BETA = 512)
CROSS-CORRELATION FROM TONE 870 TO 1205 WHITE NOISE (W)

DETAIL RESULTS – WITH RECEIVE WINDOWING (HALF BETA = 512)

DIFFERENCE OF CORRELATION BETWEEN (C) AND (W) FROM TONE 870 TO 1205

DETAIL RESULTS – WITH RECEIVE WINDOWING (HALF BETA = 256)
CROSS-CORRELATION FROM TONE 1971 TO 2500 FOR CROSS TALK NOISE (C)

DETAIL RESULTS – WITH RECEIVE WINDOWING (HALF BETA = 256)
CROSS-CORRELATION FROM TONE 1971 TO 2500 FOR WHITE NOISE (W)

DETAIL RESULTS – WITH RECEIVE WINDOWING (HALF BETA = 256)

DIFFERENCE OF CORRELATION BETWEEN (C) AND (W) FROM TONE 1971 TO 2500

DETAIL RESULTS – WITH RECEIVE WINDOWING (HALF BETA = 256)
CROSS-CORRELATION FROM TONE 870 TO 1205 CROSS-TALK NOISE (C)

DETAIL RESULTS – WITH RECEIVE WINDOWING (HALF BETA = 256)
CROSS-CORRELATION FROM TONE 870 TO 1205 WHITE NOISE (W)

DETAIL RESULTS – WITH RECEIVE WINDOWING (HALF BETA = 256)

DIFFERENCE OF CORRELATION BETWEEN (C) AND (W) FROM TONE 870 TO 1205

DETAIL RESULTS – WITH RECEIVE WINDOWING (HALF BETA = 128)
CROSS-CORRELATION FROM TONE 1971 TO 2500 FOR CROSS TALK NOISE (C)

DETAIL RESULTS – WITH RECEIVE WINDOWING (HALF BETA = 128)
CROSS-CORRELATION FROM TONE 1971 TO 2500 FOR WHITE NOISE (W)

DETAIL RESULTS – WITH RECEIVE WINDOWING (HALF BETA = 128)

DIFFERENCE OF CORRELATION BETWEEN (C) AND (W) FROM TONE 1971 TO 2500

DETAIL RESULTS – WITH RECEIVE WINDOWING (HALF BETA = 128)
CROSS-CORRELATION FROM TONE 870 TO 1205 CROSS-TALK NOISE (C)

DETAIL RESULTS – WITH RECEIVE WINDOWING (HALF BETA = 128)
CROSS-CORRELATION FROM TONE 870 TO 1205 WHITE NOISE (W)

DETAIL RESULTS – WITH RECEIVE WINDOWING (HALF BETA = 128)

DIFFERENCE OF CORRELATION BETWEEN (C) AND (W) FROM TONE 870 TO 1205

DETAIL RESULTS – WITH RECEIVE WINDOWING (HALF BETA = 64)
CROSS-CORRELATION FROM TONE 1971 TO 2500 FOR CROSS TALK NOISE (C)

DETAIL RESULTS – WITH RECEIVE WINDOWING (HALF BETA = 64)

CROSS-CORRELATION FROM TONE 1971 TO 2500 FOR WHITE NOISE (W)

DETAIL RESULTS – WITH RECEIVE WINDOWING (HALF BETA = 64)

DIFFERENCE OF CORRELATION BETWEEN (C) AND (W) FROM TONE 1971 TO 2500

DETAIL RESULTS – WITH RECEIVE WINDOWING (HALF BETA = 64)
CROSS-CORRELATION FROM TONE 870 TO 1205 CROSS-TALK NOISE (C)

DETAIL RESULTS – WITH RECEIVE WINDOWING (HALF BETA = 64)
CROSS-CORRELATION FROM TONE 870 TO 1205 WHITE NOISE (W)

DETAIL RESULTS – WITH RECEIVE WINDOWING (HALF BETA = 64)

DIFFERENCE OF CORRELATION BETWEEN (C) AND (W) FROM TONE 870 TO 1205

SYSTEMS AND METHODS FOR RESOLVING SIGNAL-TO-NOISE RATIO MARGIN DIFFERENCE IN DUAL LATENCY DISCRETE MULTI-TONE-BASED XDSL SYSTEMS UNDER COLORED NOISE CONDITIONS

CROSS REFERENCE TO RELATED APPLICATION(S)

This application claims priority to provisional patent application No. 60/712,435 filed Aug. 31, 2005, entitled, "Method and System for Resolving SNR-Margin Difference Between Fast and Interleave Channels under Colored Noise Condition for DMT-Based DSL Systems," the disclosure of which is hereby incorporated by reference in its entirety.

FIELD OF THE INVENTION

The invention relates generally to electronic data communication networks and more particularly to systems and methods reducing errors and enhancing bandwidth in dual latency DMT-based communication systems.

BACKGROUND OF THE INVENTION

High-speed data communication paths are typically required in order to make high data rate services, such as video and Internet access, available to end users. Fiber optic communication paths are well suited for these high data rate services, but are not readily available in existing communication systems and are expensive to install. Therefore, data transfer technology which can operate with little modification to existing telephone wiring connection (e.g., twisted-pair copper lines) has been developed for providing high data rate services.

Since copper lines are widely available and developed, solutions to the high speed access problem were originally focused on improving the performance of voice-band modems, which operate at the subscriber premises end over a 3 kHz voice band and transmit signals through the public switching telephone network (PSTN). The phone company network treats them exactly like voice signals. These modems presently transmit up to 56 kb/s over 2-wire telephone line, even though the practical speed was 1.2 kb/s only twenty years ago. The improvement in voice band-modems over the past years has resulted from significant advances in algorithms, digital signal processing, and semiconductor technology. Because such modems are limited to voice bandwidth (3.0 kHz), the rate is bound by the Shannon limit, that is, the theoretical limit of error-free digital data that can be transmitted over a communication link with a specified bandwidth in the presence of noise interference—in this case 3 kHz. Thus, current voice modems have probably maximized the theoretical speed limits at about 56 Kb/s. However, there is a considerable amount of bandwidth available in copper lines that has gone unused by voice-band modems, and this is why a proposal known as Asymmetric Digital Subscriber Loop (ADSL) was suggested in the industry as a high-speed protocol/connection alternative over twisted-pair copper lines. The practical limits on data rate in conventional telephone line lengths (of 24 gauge twisted pair) vary from 1.544 Mb/s for an 18,000 foot connection, to 51.840 Mb/s for a 1,000 foot connection. Since a large proportion of current telephone subscribers fall within the 18,000 foot coverage range (approximately 3.5 miles), ADSL can make the current copper wire act like a much "bigger pipe" for sending computer bits and digital information (like movies and TV channels), while still carrying the voice traffic. For example, an ADSL modem can carry information 200 times faster than the typical 56K voice band modem used today.

ADSL is "asymmetric" in that more bandwidth is allocated to downstream data (to the subscriber) than upstream (back from the subscriber). The reason for this is a combination of cost, cross-talk, speed demands, and performance. For example, twisted pair wire coupling increases with the frequency of the signal. If symmetric signals in many pairs are used within a cable, the data rate and line lengths become significantly limited by the coupling noise. Since the preponderance of target applications for digital subscriber services is asymmetric, asymmetric bit rate is not perceived to be a serious limitation at this time. Therefore, the ADSL standard proposes up to 6 Mb/s for downstream, and up to 640 kb/s for upstream. For example, video on demand, home shopping, Internet access, remote LAN access, multimedia access, and specialized PC services all feature high data rate demands downstream, to the subscriber, but relatively low data rates demands upstream. The principal advantage is that all of the high speed data operations take place in a frequency band above the voice band, leaving Plain Old Telephone Service (POTS) service independent and undisturbed, even if an ADSL modem fails. ADSL further provides an economical solution for transmission of high bandwidth information over existing copper line infrastructures.

In order to adjust for performance variations over the entire available spectrum, ADSL systems typically use discrete multi-tone (DMT) techniques (e.g., a multi-carrier technique) that divide the available bandwidth of twisted-pair copper lines into multiple channels or "bins." Using DMT, the available bandwidth is broken into a plurality of 4 kilohertz sub bands or tones and data is simultaneously transferred over several of the channels depending upon the transmission characteristics of each channel. For example, in conventional ADSL systems, the copper transmission line is divided into 256 DMT tones, separated by 4.3125 KHz, each with a different center frequency. Specifically, the T1E1.413 ADSL standard divides the available transmission bandwidth into two parts. At the lower 4 kHz band, ordinary (POTS) is provided. The bulk of the rest bandwidth in the range from 4 kHz to about 1 MHz is for data transmission in the downstream direction, which is defined to be from the exchange to the subscriber. The upstream control channel uses a 160 kHz band in between. The signals in each of these ranges can be extracted with an appropriate band-pass filter.

With DMT, a plurality of frames of a data stream is broken down into data blocks. Each data block is allocated to multiple carrier channels. A carrier channel, in turn, can be represented as a vector whose magnitude and phase is based on the data that the carrier channel is carrying and on the amount of bits that the carrier channel can support (sometimes referred to as "bit loading" or "tone ordering"). The bit loading of the carrier channel is indicative of the number of constellation points (e.g., the number of magnitude and phase combinations for the vector). Thus, if the bit loading of a particular carrier channel is 2, then the number of constellation points is 4, with a constellation point in each quadrant representing the binary number 00, 01, 10, or 11 for example. This process of associating binary numbers to constellation points is sometimes referred to as "constellation encoding" or "constellation mapping." Each of the carrier channel vectors may be used to produce a quadrature amplitude modulated (QAM) signal at a given frequency. Each channel uses QAM to carry 2 to 15 bits/QAM symbol. The QAM symbols are then summed to produce a time domain DMT "symbol" that is subsequently transmitted over the twisted-pair copper line.

That is, each of the carriers that make up the DMT symbol contains a QAM signal. A DMT symbol is generated for each frame of the original data stream. This results essentially in overall performance which is equivalent to around two hundred V.34 modems used in parallel on the same line. Because each carrier channel can be configured to a different bit rate according to the channel characteristics, it can be seen that DMT is inherently "rate-adaptive" and extremely flexible for interfacing with different subscriber equipment and line conditions.

In typical DMT implementations, such as shown in U.S. Pat. No. 5,479,447 to Chow et. al., hereby incorporated by reference in its entirety, transmission power to the individual channels is initially configured based on the noise power and transmission loss in each band. In this way, channels with less noise and attenuation can carry larger amounts of data, while poorer sub-channels can be configured to carry fewer bits and can even be shut down entirely. Information on the transmission characteristics of each sub-channel is typically stored in a bit and energy table as discussed, for example, in U.S. Pat. No. 5,596,604 to Cioffi et. al. hereby incorporated by reference in its entirety.

Initial line conditions may vary after initialization because of temperature fluctuations, interference, etc. This can affect both the error rate and maximum data throughput. Therefore, by measuring the quality of each sub-channel on an ongoing basis, an "updated" bit and energy table may be maintained to adaptively configure the system for maximum data throughput or error performance on an ongoing basis. In normal applications, if the quality of any particular channel degrades to the point where the error performance of the system is compromised, one or more bits on that sub-channel are automatically moved to a sub-channel that can support additional bits.

In order to improve the accuracy and performance of broadband modems, manufacturers began to design system to segment data depending on its characteristics and to transmit the information differently based on this segmenting—that is, some information may be less tolerant of errors than of latency, such as voice for example, while other information may require the least error prone transmission but be generally tolerant of latency, such as data for example.

In recognition of the differing accuracy and latency requirements of different data types transmitted over high speed data lines, dual latency techniques have been developed. In dual latency, multiple data paths are established over the available DMT channels—a fast path which has minimal latency but may contain errors and an interleaved path incorporating various forward error correction techniques to reduce the bit error rate (BER) for applications that require accuracy over speed.

As noted above, the interleaved data path often employs one or more forward error correction (FEC) techniques which, while adding latency to the data transmission, reduce the BER of the transmitted data. Typically, this involves addition of redundant information to the basic data, also known as payload data. The data bytes and redundant bytes together form a unit called a codeword. Redundant bytes are generally added on to the data bytes to form the last bytes of the codeword. The number of frames in a codeword is user selectable and is dependent on the number of payload bytes in a frame and the maximum size of a codeword. As a result of using a forward error correction techniques, a group of redundancy bytes are added to the S frames of payload data to form a codeword having a length of N bytes, which equals the number of redundancy bytes (R) plus the aggregate number of basic data bytes (K) for the S frames of data. The redundant bytes allows a degree of error detection and correction at the receiving end of the communication system.

Another forward error correction technique that may be employed in DSL systems in the interleaved data path is Reed-Solomon coding. Reed-Solomon coding works by first constructing a polynomial of the data symbols to be transmitted and then sending an over-sampled plot of the polynomial instead of the original symbols themselves. Because of the redundant information contained in the over-sampled data, it is possible to reconstruct the original polynomial and thus the data symbols even in the face of transmission errors, up to a certain degree of error. The advantage of using Reed-Solomon codes is that the probability of an error remaining in the decoded data is (usually) much lower than the probability of an error if Reed-Solomon is not used. This is often described as the coding gain. For example, a digital communication system is designed to operate at a BER of $10^{-9}$, that is no more than 1 in $10^9$ bits are received in error. This can be achieved by boosting the transmission power or by adding Reed-Solomon or other FEC. Reed-Solomon allows the system to achieve this target BER with a lower transmitter output power. The power saving given by Reed-Solomon (in decibels) is the coding gain.

Yet another forward error correction technique employed in DSL systems is Trellis coding. The idea behind Trellis coding is that operations of modulation and coding are combined. The bandwidth is not expanded, that is, the symbol rate remains the same, but redundancy is introduced by using a constellation with more points than would be required without coding. The difference in signal-to-noise ratios between a coded and uncoded system of the same information rate that produced the same error probability is referred to as the coding gain. For a discussion of Trellis coded modulation refer to commonly assigned United States published patent application 2005/0010853 hereby incorporated by reference its entirety. Trellis coding may be used in both the fast and interleaved data paths.

A known problem with DMT-based DSL systems is noise. Noise in a DSL system can come in the form of additive white Gaussian noise (AWGN) attributable to outside sources and colored noise that can vary across the channel. Colored noise may be caused by cross-talk interference from adjacent signals in the twisted pair line. AWGN is white noise with a constant spectral density and a Gaussian distribution of amplitude. Before communicating over a DSL line, equipment at the central office (CO) as well as at the consumer premesis (CPE) will determined the current line conditions, that is the amount of noise on the line. Existing dual latency-based DSL systems estimate the received noise PSD at the provider's central office (CO) assuming the same noise margin for both fast and interleaved data paths. This results in a greater number of errors on the fast data path and an overall reduction in bandwidth.

Because AWGN and cross-talk noise can affect fast and interleaved data paths differently, existing solutions provide less than optimal performance. In practice, the signal-to-noise ratios for these paths will differ. Thus, there exists a need for improved systems and methods for resolving the signal-to-noise ratio (SNR) difference between fast and interleaved data path in dual latency xDSL systems.

SUMMARY OF THE INVENTION

Thus, in view of the foregoing shortcomings and limitations of conventional dual latency systems an object of the embodiments of this invention is to provide systems and methods for resolving the SNR margin difference between fast and interleaved channel paths in a dual latency DMT-based xDSL communication system. In one embodiment, an xDSL transceiver may perform run-time detection of the noise power spectrum density (PSD) on the communication line, or based on a-priori information, determine the band edges that are vulnerable to colored (non-constant) noise. In the fast data path, extra margin is allocated at the edge of the receiving (Rx) bands. In a dual latency system fast channel tones are allocated away from the band edge.

At least one embodiment of the invention provides a method of resolving the SNR margin difference between fast and interleaved channels in a dual latency DMT-based xDSL communication system. The method according to this embodiment comprises dividing a communication channel into a plurality of equal bandwidth sub-channels, determining the transmission characteristics of each sub-channel, establishing two data paths from the sub-channels, wherein the data paths are characterized in having different target SNR margin, and allocating data having a relatively higher SNR margin near band edges, and allocating data having a relatively lower SNR margin away from these band edges.

At least one other embodiment according to this invention provides a method of reducing performance variation between fast and interleaved data paths in a dual latency DMT-based xDSL system. The method according to this embodiment comprises dividing a communication channel into a plurality of equal bandwidth tones, allocating the plurality of tones into fast and interleaved data paths, determining band edges of the communication channel that are vulnerable to colored (non-constant) noise, and allocating tones in the fast data path away from the band edges.

At least one additional embodiment according to this invention provides a chipset for an xDSL transceiver. The chipset according to this embodiment comprises circuitry adapted to determined conditions of a communication line between a customers premises and a central office, circuitry adapted to divide the communication line into a plurality of equal bandwidth sub-channels, circuitry adapted to allocate the plurality of equal bandwidth sub-channels into first and second parallel data paths, wherein the first data path is characterized as a being a relatively faster data path and the second data paths is characterize as being an interleaved data path, circuitry adapted to determine band edges on the communication channel that are vulnerable to colored noise, and circuitry adapted to allocate data onto sub-carriers in the relatively faster data path away from the band edges.

These and other embodiments and advantages of the present invention will become apparent from the following detailed description, taken in conjunction with the accompanying drawings, illustrating by way of example the principles of the invention.

DETAILED DESCRIPTION

Figure 1:
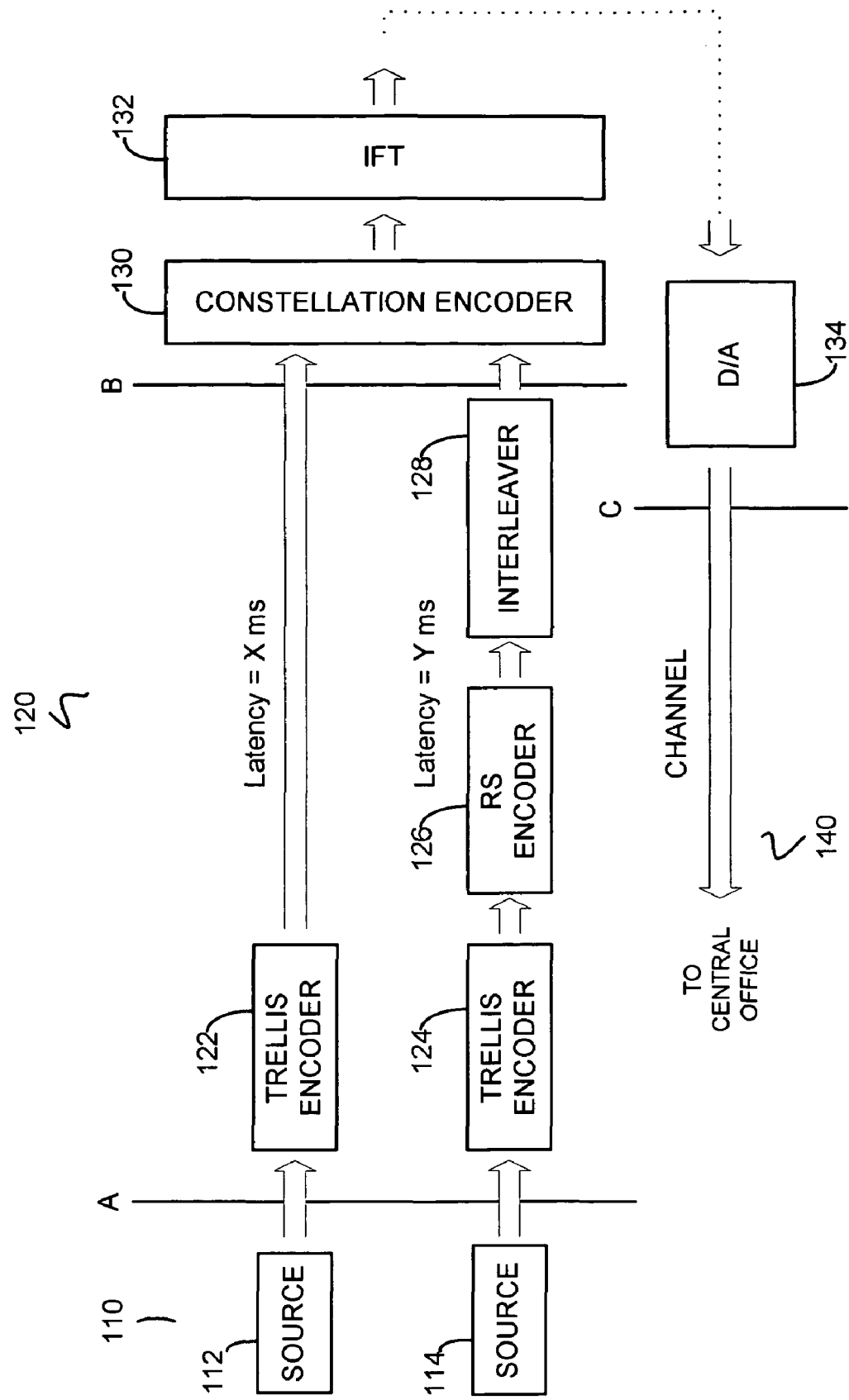
FIG. 1 is a block diagram illustrating an exemplary dual latency DMT-based communication system usable with various embodiments of the invention.

The following description is intended to convey a thorough understanding of the embodiments described by providing a number of specific embodiments and details involving systems and methods for resolving the SNR margin difference in dual latency DMT-based xDSL communication systems. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As noted above, in dual latency DMT-based xDSL systems, two data paths are established over the available sub-channels, also referred to here in as carriers. Through this scheme, segregation is possible based on the particular service type being transmitted. For example, data and even video may be bit error rate (BER) sensitive but able to tolerate latency. Thus, in a dual latency system, when transmitting data or video the slower interleaved data path will be used. On the other hand, voice and gaming applications may be tolerant of higher BERs but intolerant of delays due to forward error correction (FEC). For such services, the fast data path will be used.

The present invention provides new techniques to resolve SNR-margin difference between fast and interleave channels under colored noise condition for DMT-based DSL system. Current DSL standards assume the same SNR margin for both fast and interleave channels under cross-talk colored noise condition. This invalid assumption causes system performance degrades such as burst of RS error and CRC error in real deployment. The present invention allows for more robust system performance. Objectives of the invention include: (1) improving system robustness—various embodiments of the invention can provide more stable performance such as less Reed-Solomon (RS) errors and less CRC errors; and (2) increase effective data rate while sustaining the margin and protecting the data—various embodiments of the invention can permit assigning more reasonable margin based on the tone locations. The new margin can maximize the information loaded in each tone while maximizing the error protection for this information.

A problem arises in a conventional dual latency DMT-based xDSL communication system in that a difference in SNR margin is observed between the fast and interleaved channel paths. The inventors of this invention have determined that this is attributable primarily to tones near the band edge. The band edges are the borders between the upstream and downstream portions of the communications channel. For tones sufficiently far away from the band edges, there is little observed difference in SNR margin between the fast and interleaved channels, that is, these paths perform the same in terms of signal recovery. One problem to be appreciated is that because of the correlation effects of cross-talk noise, the fast data path suffers a lower SNR margin, which induces more Reed Solomon errors and CRC errors. Thus, in order to reduce this effect, various embodiments of the invention allocate only interleaved data near the band edges and allocate non-interleaved data (the "fast channel" data) to other areas away from the band edges.

Referring now to FIG. 1, a block diagram illustrating a exemplary dual latency communication system usable with the various embodiments of the invention is depicted. The system includes sections divided by reference lines A, B and C. The system includes a data source section 110 which in various embodiments, may be a computer, telephone, storage medium, video and/or audio data source or other data source. The system also includes, in at least one embodiment, an DMT-based xDSL transceiver 120 configured to receive information from the data sources 110. For ease of explanation, operation of the system of FIG. 1 will be described in the context of a transmit mode of operation. However, it should be appreciated that the system may also operate in a receive mode of operation in which signal processing operations are performed in a substantially reverse manner to the transmit mode of operation.

As noted above, the system may include a plurality of information sources 110, such as, for example, a voice source 112 and data source 114. In various embodiments, a plurality of different information sources including voice, data, video, video gaming, or other types of information may be supplied to the reference line A. Reference line A is representative of the connection to the transceiver 120. In various embodiments, each of these information sources may provide information to the transceiver 120 in the form of asynchronous transfer mode (ATM) frames or cells, which are generated and sent to the transceiver 120 using known ATM techniques such as through a network interface card (NIC). In other embodiments, the information from one or more of the sources 110 may be sent to the transceiver 120 using formats and techniques other packet-based protocol.

In accordance with one embodiment of the invention separate processing paths may be provided to the transceiver 120 as illustrated in FIG. 1. In various embodiments, this may comprise separate physical connections to the transceiver 120 leading directly to the separate data paths, latency X and latency Y, as shown in the figure. Alternatively, in various embodiments, there may only be a single physical input to the transceiver 120 and hardware and/or software in the transceiver itself may direct the incoming information to one of the two data paths depending upon the designation of the data, that is, as latency or error sensitive.

In various embodiments, information entering the transceiver 120 at reference point A that is designated as being latency tolerant (i.e. error intolerant) will be sent over the latency Y data path. As seen in the figure, this data path may include one or more forward error correction (FEC) blocks such as Trellis coder 124 and Reed-Solomon coder 125. Any suitable FEC technique, such as those known in the art may be used. Additional detail of forward error correction can be found in International Telecommunications Union—Telecommunication Standardization Sector, "Draft Recommendation: G.992.2—Splitterless Asymmetric Digital Subscriber Line (ADSL) Transceivers," June/July 1999.

In various embodiments, the latency Y path will also include an interleaver block 128. In various embodiments, the interleaver block 128 uses convolutional interleaving to interleave the codewords from the FEC blocks 124 and 126. An example of convolutional interleaving can be found in the aforementioned G.992.2 standards document. However, it should be appreciated that while current xDSL transceivers utilize convolutional interleaving other embodiments may utilize a different type of interleaving.

With continued reference to FIG. 1, the latency X data path contains only Trellis coder block 122 and may also be referred to as the fast or non-interleaved data path. Due to the lack of interleaving and additional FEC blocks, the latency X data path relatively faster than the latency Y data path. As noted herein, another consequence is that data transmitted through this path is relatively more likely to contain errors than the interleaved latency Y path. Thus, this path may be used for time sensitive, error tolerant applications such as voice or even video. It should be appreciated that while only two data paths are shown in the figure, the various embodiments of the invention may be used with multiple data paths, that is, more than two, such as, for example to handle the transmission of information that needs a combination of FEC and low latency that is between or even less or greater than the latency X and latency Y paths shown in the figure.

It should also be appreciated that the two data paths shown in the figure comprise an allocation of available carrier channels of the communication medium. Each carrier of the N available carriers corresponds to a sub-channel of the communication medium. The number of channels utilized in data transmission in a DMT-based xDSL system is usually determined during initialization between the customer premises transceiver and the central office transceiver. According to the ADSL ANSI T1.413 standard, the transceiver may utilize up to 256 channels separated by approximately 4 kilohertz. The first 32 channels in the range from 0 to approximately 138 kilohertz could be full duplex channels while the remaining 224 channels in the frequency range from 138 kilohertz to 1.1 megahertz are half duplex channels. Each loaded channel may support a minimum of 2 bits (4 unique binary numbers) to up to 15 bits (32,768 unique binary numbers) of QAM information. The actual number of bits a channel supports various due to the spectral response of the transmission line, such as, for example, in various embodiments, a twisted-pair copper plain old telephone service (POTS) line. The constellation encoder 30 iteratively loads bits onto available carriers.

Transmission channels are typically characterized by the channel's margin, signal-to-noise ratio gap (hereinafter SNR gap), and capacity. All are related concepts. The margin is the amount of additional signal-to-noise ratio in excess of the minimum required to achieve a given performance level for a particular type of modulation scheme with a particular SNR gap. The SNR gap is a function of a chosen probability of transmission error and the modulation and coding techniques. The SNR gap measures the inefficiency of the transmission method with respect to the best possible performance, assuming an additive white Gaussian noise channel. The SNR gap is often constant over a wide range of transmission rates which may be transmitted by the particular modulation coding technique. The channel capacity refers to the maximum data rate capable of being transmitted on a particular channel. The optimum line coding technique has a SNR gap of zero dB.

Although such an optimum line code requires infinite decoding/encoding delay and is infinitely complex, it has become practical at typical Digital Subscriber Line (DSL) speeds to implement modulation methods to achieve SNR gaps as low as 1-2 dB. Therefore, one factor to be considered during the bit allocation process is the transmission quality of each subchannel, in order to maximize the bit allocation for each subchannel.

Figure 2:
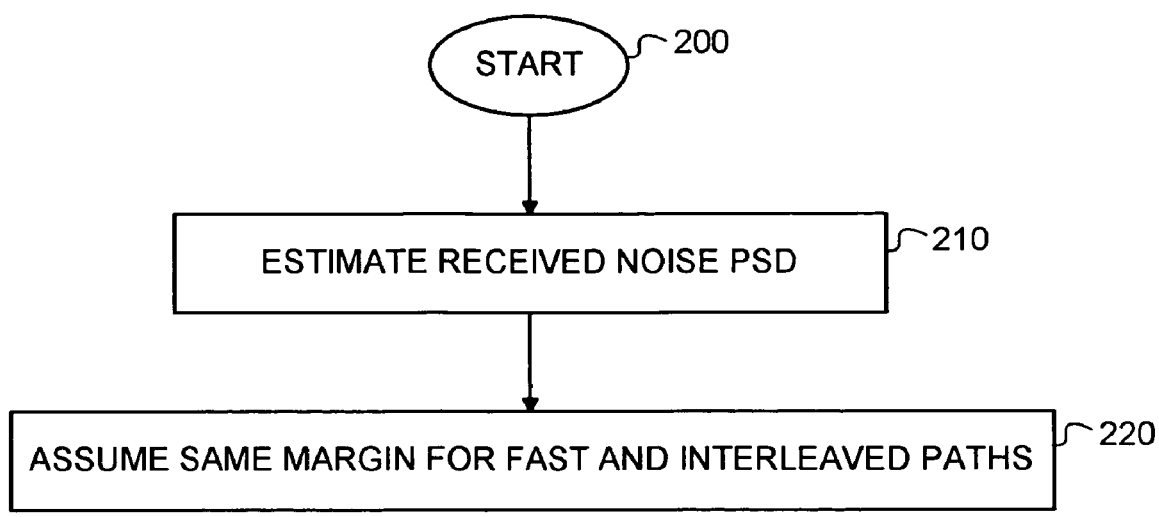
FIG. 2 is a flow chart depicting a prior art method of performing bit loading in a dual latency DMT-based transceiver.

Referring now to FIG. 2, this Figure depicts a flow chart outlining the steps of a prior art method of performing bit loading in a dual latency DMT-based communication system. The method begins in step 200 and proceeds to step 210 where the power spectral density (PSD) of the receive noise on the xDSL communication channel is estimated. In a typical xDSL system using dual latency, as shown in step 220, this estimation comprises assuming the same SNR margin in both the fast and interleaved (slow) data paths. However, as discussed herein, this assumption is incorrect and leads to greater overall error rate due primarily to the data traveling on the fast data channels nears the band edges, that is, the borders in the frequency spectrum between the portion of the channel allocated to upstream data and that allocated to downstream data.

As discussed herein, it has been observed that when crosstalk noise is present, the interleaved data path has higher noise margin than does the fast path. Analysis shows that this is due to the fact that there exists certain correlation from tone to tone due to cross-talk noise. This correlation in the frequency-domain is due to the side-lobe roll-off from Near-End Cross talks (NEXT), which is a by-product when applying the fast Fourier transform (FFT) at the receiving side.

Figure 3:
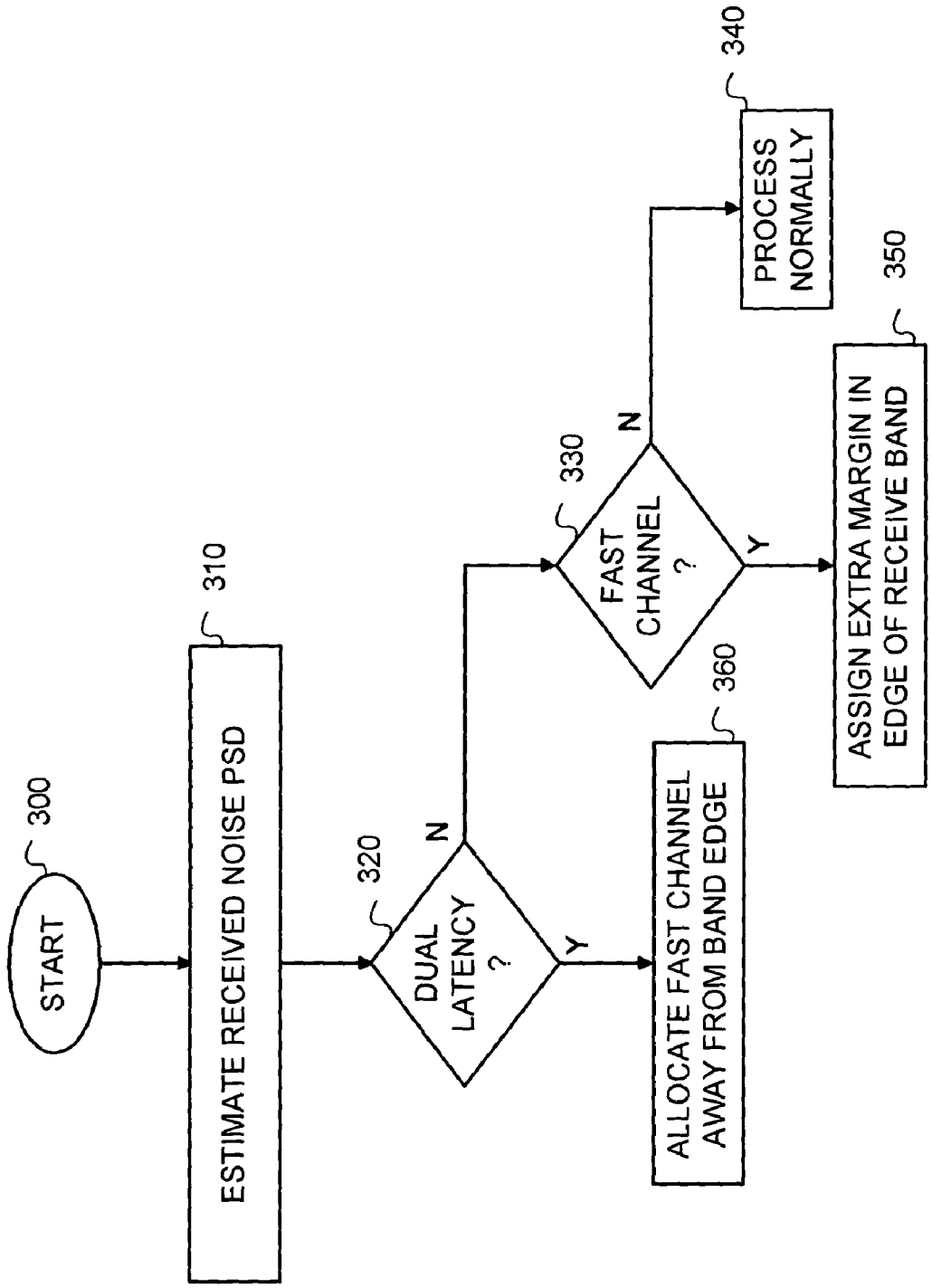
FIG. 3 is a flow chart depicting a method of performing bit allocation that resolves the SNR margin difference between fast and interleaved channels in a dual latency communication system according to at least one embodiment of the invention.

FIG. 3 is a flow chart depicting a method of performing bit allocation that resolves the SNR margin difference between fast and interleaved channels in a dual latency communication system according to at least one embodiment of the invention. The method begins in step 300 and proceeds to step 310 where the sub-process of estimating the receive noise PSD of the communication channel begins. Unlike the prior art process of FIG. 2, this process does not assume the same noise on both fast and interleaved channels. Operation proceeds to step 320 where a determination is made whether the channel is using dual latency, that is, whether there are fast and interleaved (slow) data paths on the channel. If it is determined in step 320 that the channel is a dual latency channel, operation goes to step 360. In step 360, interleaved channels are assigned to those tones near the band edge since they are less susceptible to cross-talk noise errors and fast channels are assigned elsewhere.

Otherwise, if in step 320, it is determined that the channel is not a dual latency channel, then, in step 330, a determination is made as to whether the channel is a fast channel or an interleaved channel. That is, there is only a single data path on the channel containing—either a fast data path or an interleaved data path. If in step 330 it is determined that the current channel is an interleaved channel, that is, not a fast channel, operation proceeds to step 340 where the channel is processed normally. That is, the original SNR margin is used. Otherwise, if in step 330 it is determined that the current channel is a fast channel, an extra margin of unallocated tones is assigned in the edge of the receive band. That is, the SNR margin is increased for those tones near the band edge because these tones are more vulnerable to cross-talk errors.

In order to demonstrate the effectiveness of the various systems and methods disclosed herein, multiple simulations were performed under a variety of conditions as shown in FIGS. 4-34. In the simulation, real measurements were taken comparing the noise margin of fast and interleave paths when AWGN and cross-talk noise is present. Then the noise margin of the fast and interleave path is compared when cross-talk noise is present and NEXT is reduced by backing off 20-tones in the boundary. Then, the noise margin of fast and interleaved paths is compared when cross-talk noise is present and NEXT is reduced by backing off 40 tones in the boundary. This process is then repeated using receive windowing of varying length. The results show that after adding a Rx (receive) window and backing-off 40 tones, the fast margin and interleaved channel margins become comparable, that is the difference in SNR between these two paths is reduced. Therefore, because their respective SNRs are the same, it is not necessary to increase the SNR margin for low-SNR channels, such as is required when there is no backing-off. In this scenario, the correlation due to side-lobe roll-off is reduced. Therefore, the fast and interleaved data paths show similar performance. However, without Rx windowing, backing-off tones alone does not help reduce the margin difference as significantly. This is due to brick-wall effects in time domain that cause tremendous roll-offs in frequency domain. In this scenario, the correlation due to roll-off still exists so with back-off only and no windowing, going through fast path or interleaved path makes a difference in performance.

Table 1.1 below illustrates measured simulation results at the central office (CO) with receive windowing and varying amounts of tone back-off at the boundary using a 3000 feet loop length in the presence of cross talk under a variety of conditions:

TABLE 1.1

| | Fast Path | | | | Interleaved Path | | |
|---|---|---|---|---|---|---|---|
| Noise Off-set | CO Margin | RS Error CO | CRC Error CO | Noise Offset | CO Margin | RS Error CO | CRC Error CO |
| A1 with Rx windowing, D/S backoff 0 tones | | | | | | | |
| 2 dB | 5 dB | 529 | 0 | 2 dB | 5 dB | 503 | 0 |
| 4 dB | 3.5 dB | 33102 | 0 | 4 dB | 3.5 dB | 50387 | 0 |
| 5 dB | 2.5 dB | 164736 | 212 | 5 dB | 2.5 dB | 198671 | 0 |
| 6 dB | 2 dB | 471713 | 2715 | 6 dB | 2 dB | 505741 | 1 |
| A1 with Rx windowing, D/S backoff 20 tones at boundary | | | | | | | |
| 2 dB | 5 dB | 3873 | 0 | 2 dB | 5 dB | 2884 | 0 |
| 4 dB | 4 dB | 27639 | 2 | 4 dB | 3.5 dB | 46363 | 0 |
| 6 dB | 2 dB | 480928 | 4733 | 6 dB | 2 dB | 520935 | 0 |
| A1 with Rx windowing, D/S backoff 40 tones at boundary | | | | | | | |
| 2 dB | 5 dB | 1332 | 0 | 2 dB | 5 dB | 1208 | 0 |
| 4 dB | 4 dB | 20928 | 0 | 4 dB | 4 dB | 20884 | 0 |
| 5 dB | 3 dB | 76375 | 0 | | | | |
| 6 dB | 2.5 dB | 250327 | 10 | 6 dB | 2.5 dB | 250481 | 0 |
| A0 w/o Rx windowing, D/S backoff 0 tones | | | | | | | |
| 2 dB | 4.5 dB | 4371 | 20 | 2 dB | 4.5 dB | 5770 | 0 |
| 4 dB | 2.5 dB | 90267 | 3531 | 4 dB | 2.5 dB | 115204 | 0 |
| 6 dB | 1 dB | 421784 | 26618 | 6 dB | 1 dB | 917930 | 1475 |
| A0 w/o Rx windowing, D/S backoff 20 tones at boundary | | | | | | | |
| 2 dB | 4.5 dB | 2925 | 33 | 2 dB | 4.5 dB | 4797 | 0 |
| 4 dB | 2.5 dB | 67591 | 2038 | 4 dB | 2.5 dB | 99514 | 0 |
| 6 dB | 1 dB | 364570 | 25488 | 6 dB | 1 dB | 938135 | 980 |
| A0 w/o Rx windowing, D/S backoff 40 tones at boundary | | | | | | | |
| 2 dB | 4.5 dB | 6471 | 64 | 2 dB | 4.5 dB | 9928 | 0 |
| 4 dB | 3 dB | 82566 | 2276 | 4 dB | 2.5 dB | 135444 | 0 |
| | | | | 5 dB | 2 dB | 432058 | 7 |
| 6 dB | 1 dB | 440238 | 24468 | 6 dB | 1 dB | 941655 | 409 |

The simulation results shown above in Table 1.1 were performed by: (1) generating cross-talk noise in the time domain, (2) chopping the noise signal into frames where each frame has 8832 samples, (3) performing a fast Fourier transform (FFT) to obtain the frequency domain noise, (4) computing the cross-correlation from tone 870 to tone 1205 (US1) and (5) from tone 1971 to tone 2500 (US2) and (5) generating additive white Gaussian noise (AWGN) in the time domain, then repeating steps (2)-(5). Next, a receive windowing of varying lengths was applied while repeating steps (1)-(6) for each window length.

Referring now to the results shown in FIGS. 4-34, the simulation results showed a correlation in the frequency domain when cross-talk noise is present. The results also showed that there is no cross-correlation in the frequency domain when only AWGN noise is present. The correlation is higher in the band boundary. It was observed that by adding long receive windowing (half beta=512), the cross-correlation becomes negligible even when cross-talk noise is present. Half beta indicates the length of the window transition from 0 to 1. Furthermore, the simulation results show that the correlation in the presence of cross-talk noise is due to roll-off from the down stream band. Since receive windowing helps attenuate the roll-offs, the correlation is reduced when roll-offs decrease.

Figure 4:
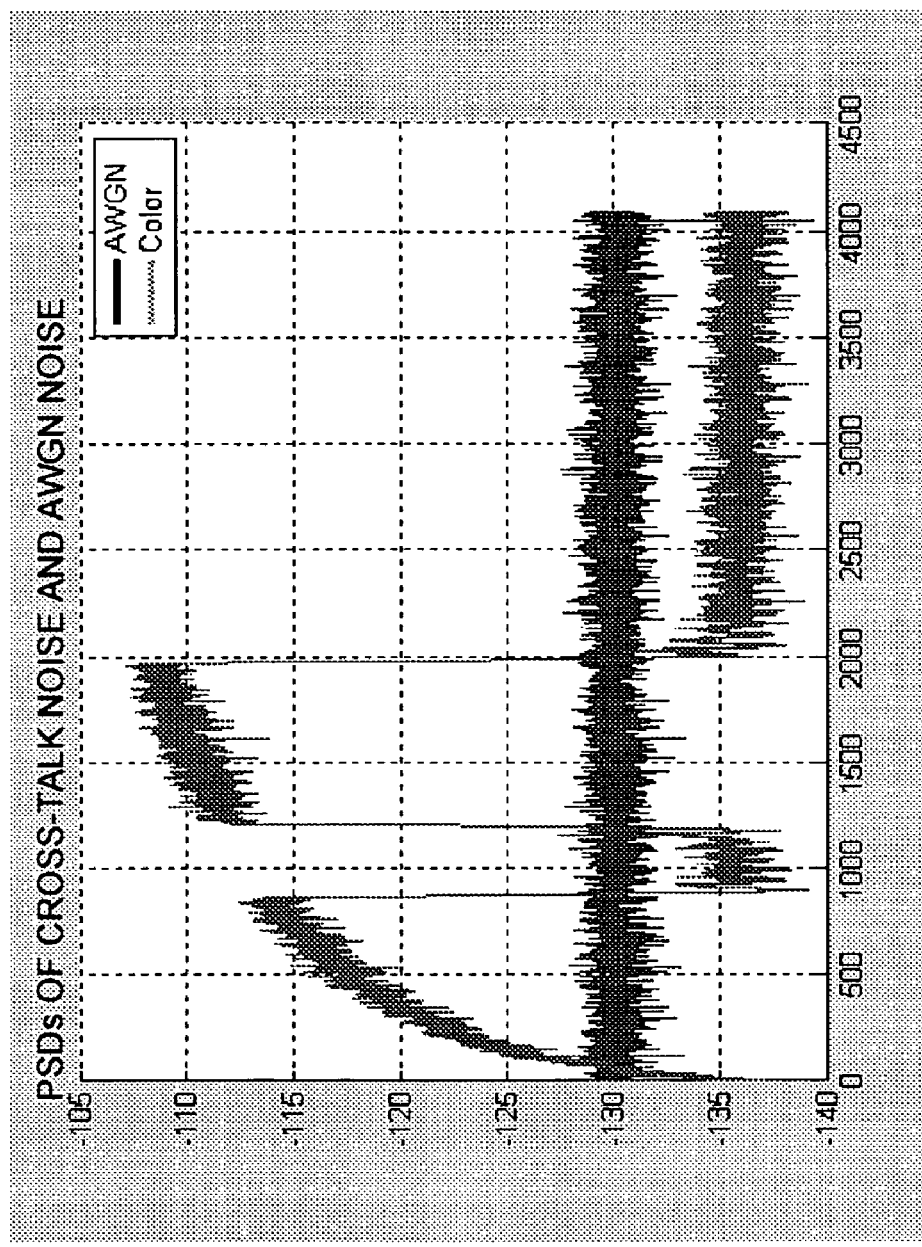
FIG. 4 is a graph illustrating the power spectral density of cross-talk noise and white noise across all tones of a DMT-based xDSL communication channel.
Figure 5:
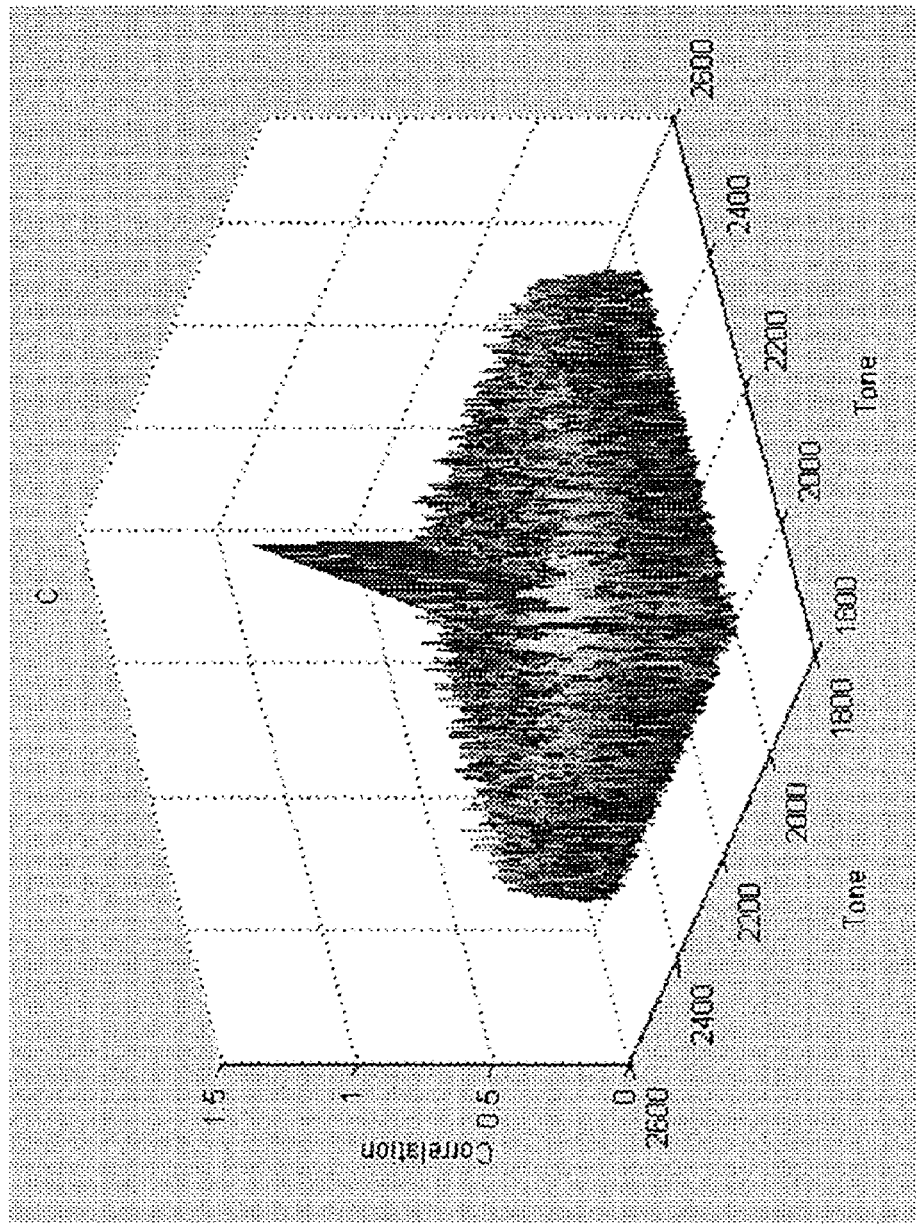
FIG. 5 is a graph of simulation results showing the cross-correlation from tone 1971 to 2500 for cross-talk noise.
Figure 6:
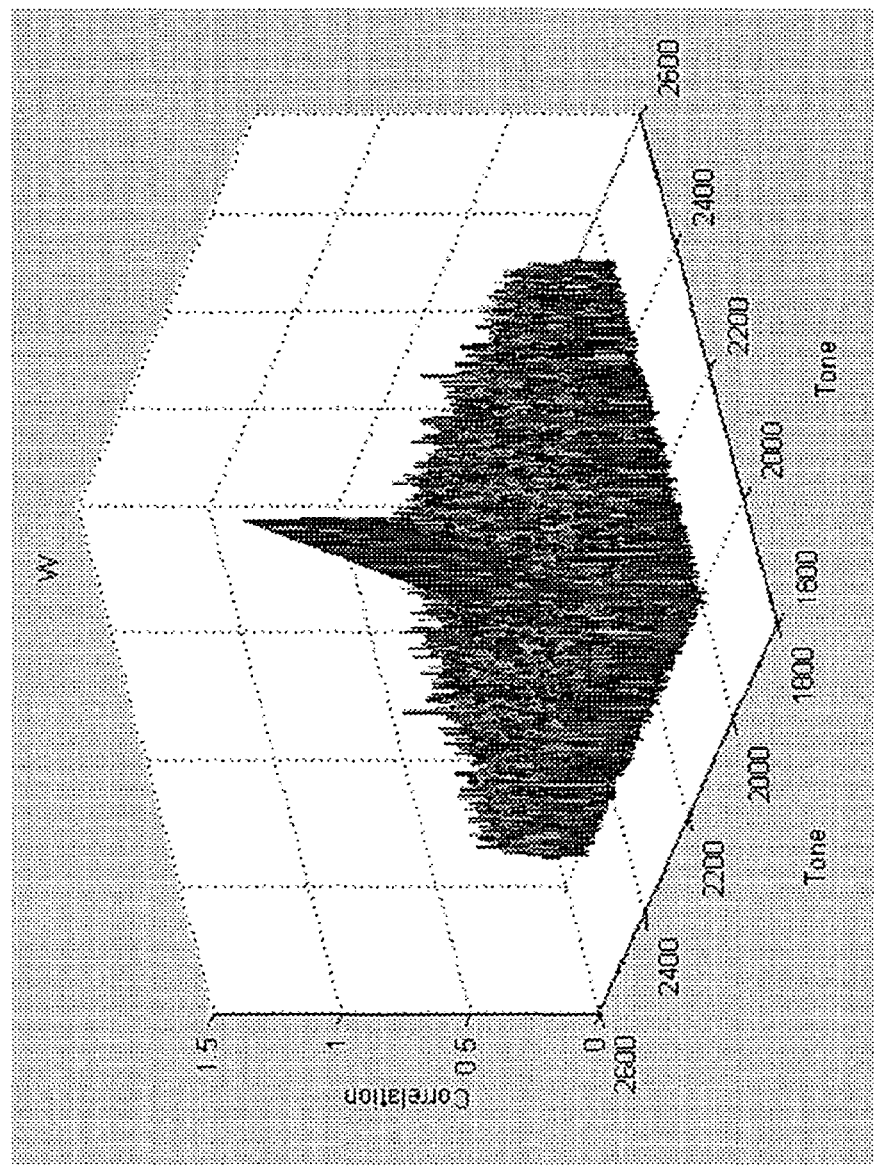
FIG. 6 is a graph of simulation results showing the cross-correlation from tone 1971 to 2500 for white noise.
Figure 7:
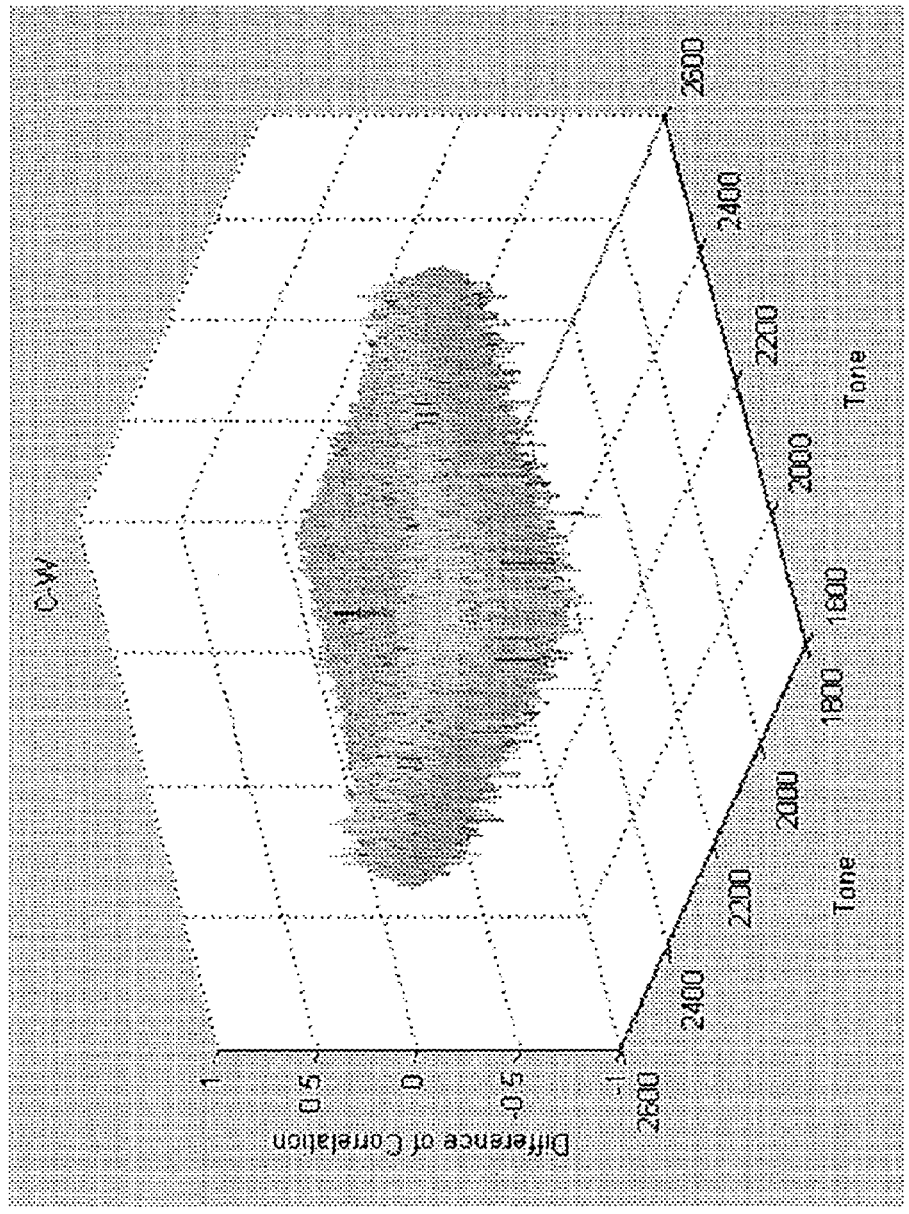
FIG. 7 is a graph of simulation results showing the difference of correlation between cross-talk noise and white noise from tone 1971 to 2500.
Figure 8:
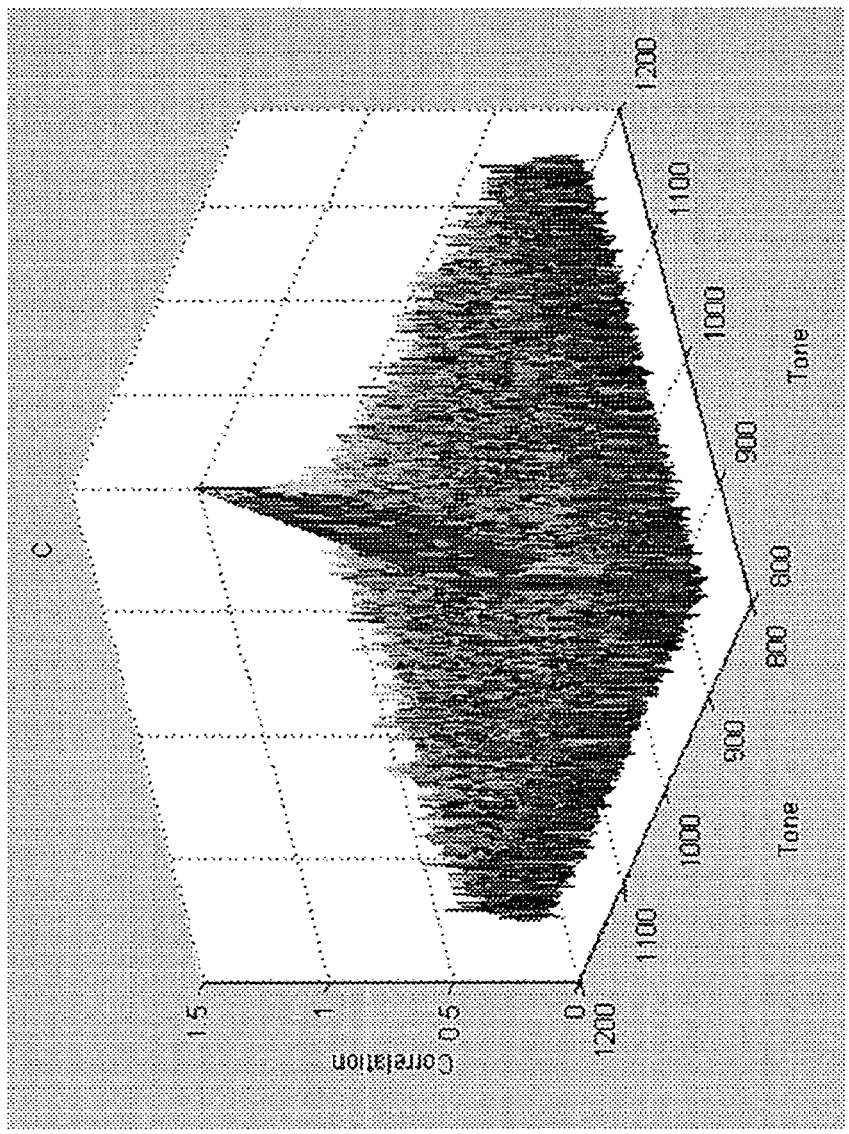
FIG. 8 is a graph of simulation results showing the cross-correlation from tone 870 to 1205 for cross-talk noise.
Figure 9:
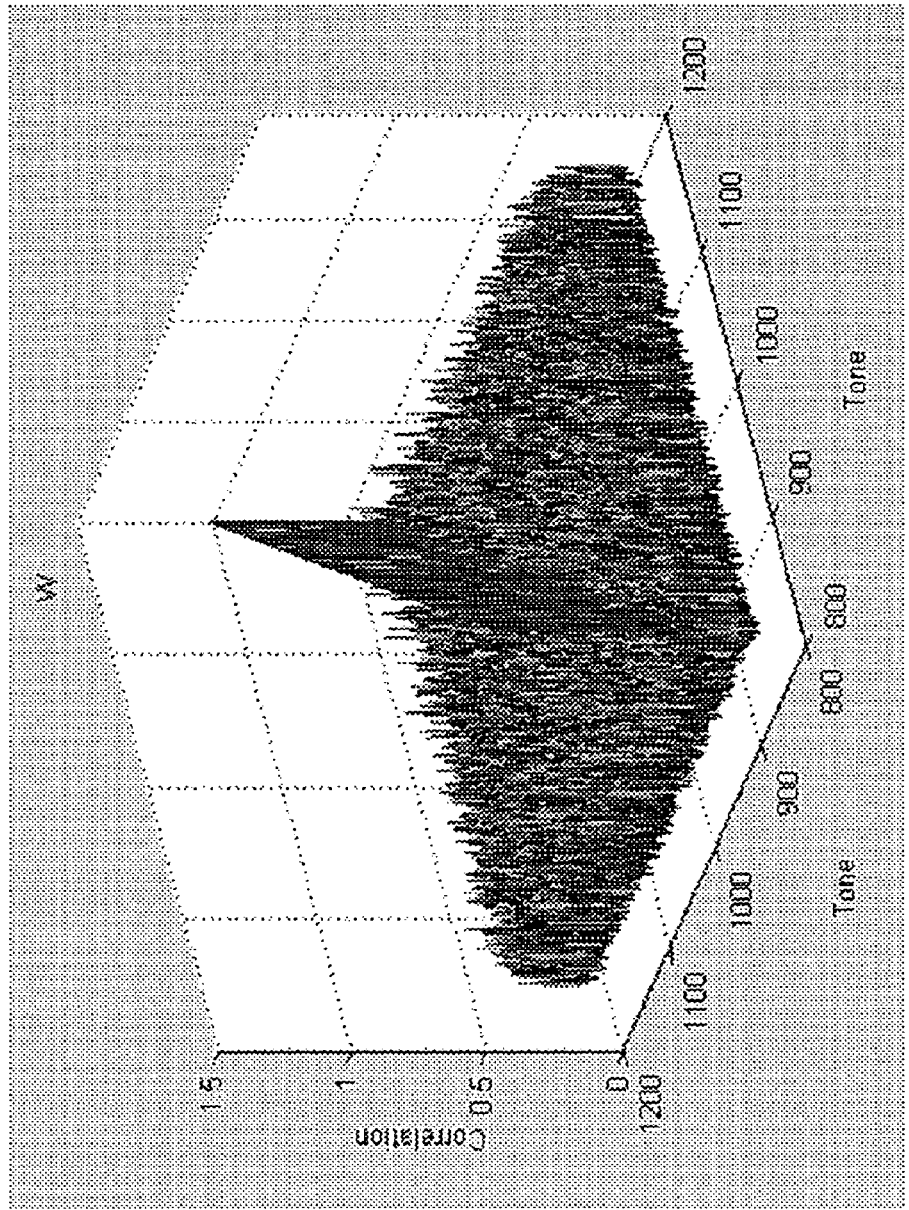
FIG. 9 is a graph of simulation results showing the cross-correlation from tone 870 to 1205 for white noise.
Figure 10:
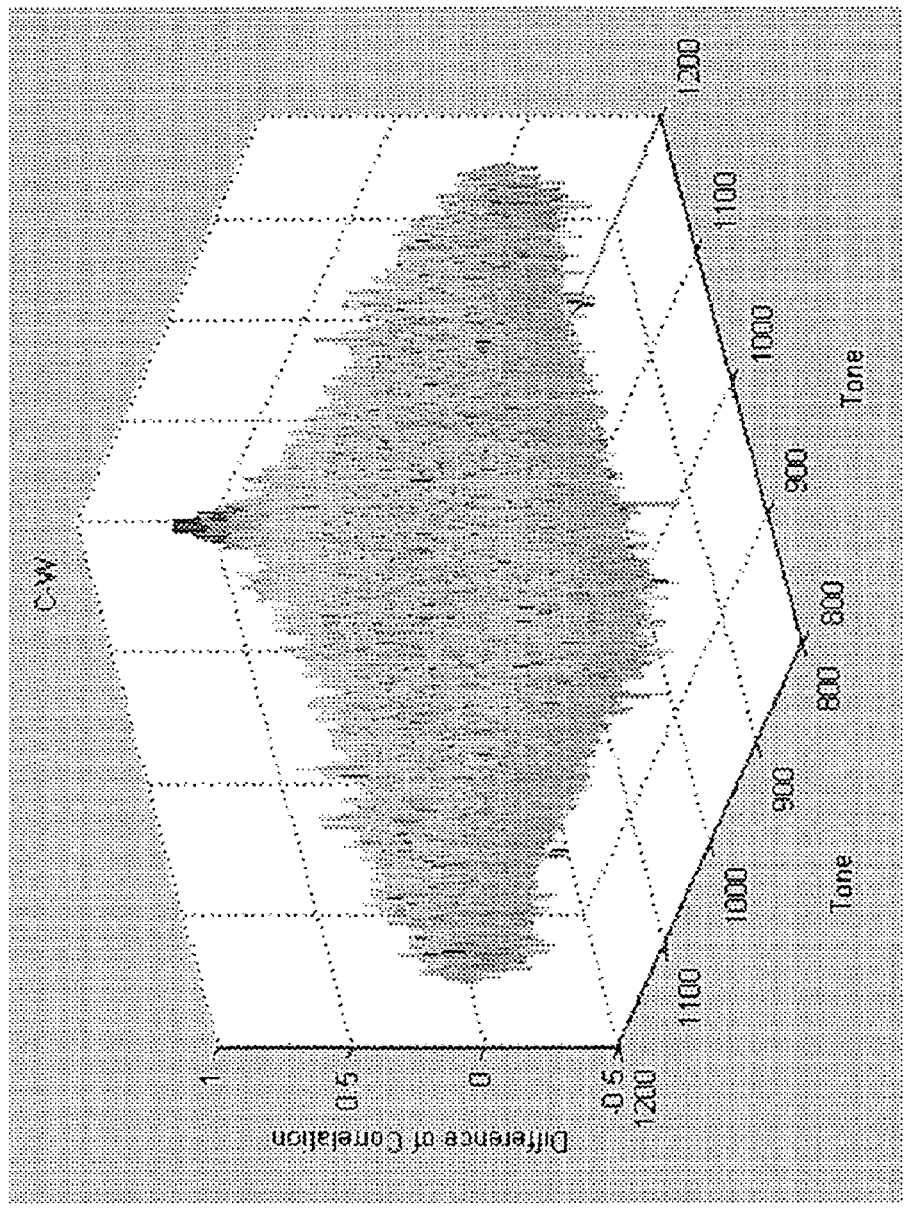
FIG. 10 is a graph of simulation results showing the difference of correlation between cross-talk noise and white noise from tone 870 to 1205.

FIGS. 4-34 may be separated into five categories based on the simulation conditions. Referring firstly to FIG. 4, a measurement of the PSD of white (AWGN) and cross-talk noise across all tones is shown. FIGS. 5-10 illustrate the first set of simulation results when no receive windowing is used. FIGS. 5 and 6 show the cross-correlation for cross-talk noise and AWGN respectively for tones 1971 to 2500, and FIG. 7 shows the difference of correlation between cross-talk and white noise across the same tones. Similarly, FIGS. 8 and 9 show the cross-correlation for cross-talk noise and AWGN respectively for tones 870 to 1205, and FIG. 7 shows the difference of correlation between cross-talk and white noise across the same tones. FIGS. 5-34 demonstrate that colored-noise induces a higher correlation at the band edge than does AWGN noise. Windowing helps reduce the correlation at the band edge and the longer the windowing the more that the correlation is reduced—that is for windowing with half-beta equal to 512, 256, 128 and 64.

Figure 11:
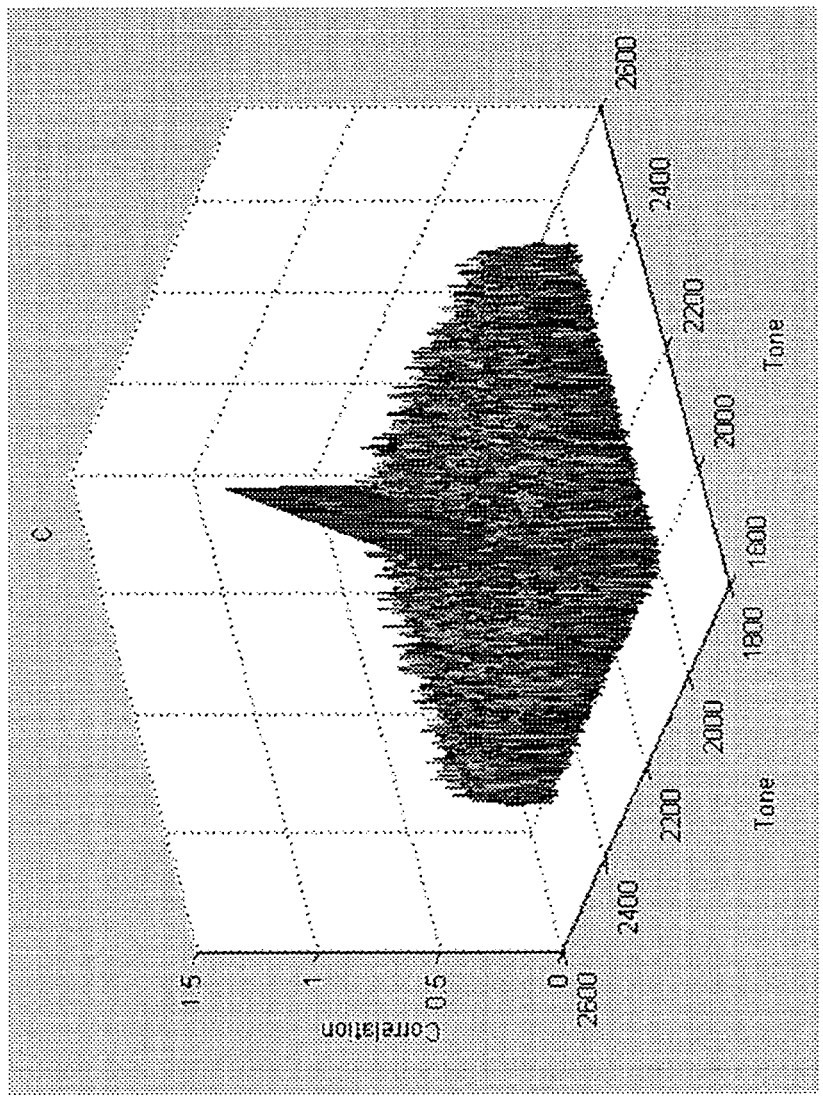
FIG. 11 is a graph of simulation results showing the cross-correlation from tone 1971 to 2500 for cross-talk noise with half beta equal to 512.
Figure 12:
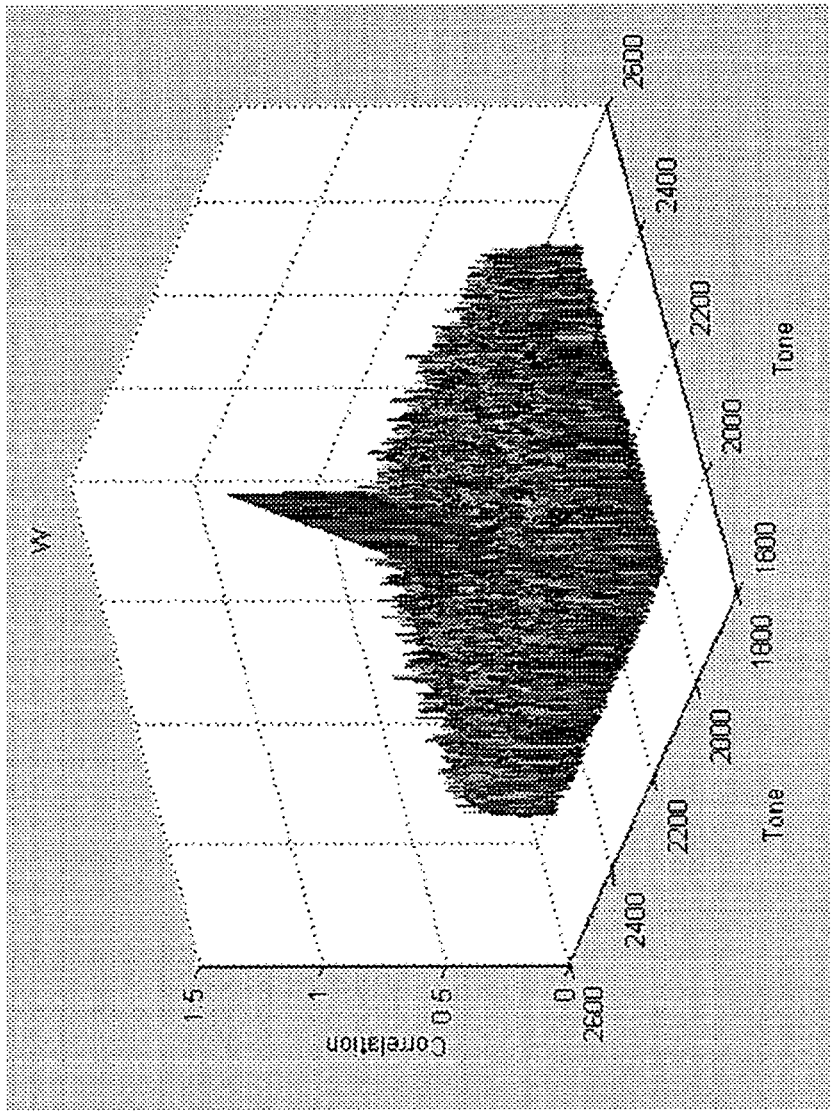
FIG. 12 is a graph of simulation results showing the cross-correlation from tone 1971 to 2500 for white noise with half beta equal to 512.
Figure 13:
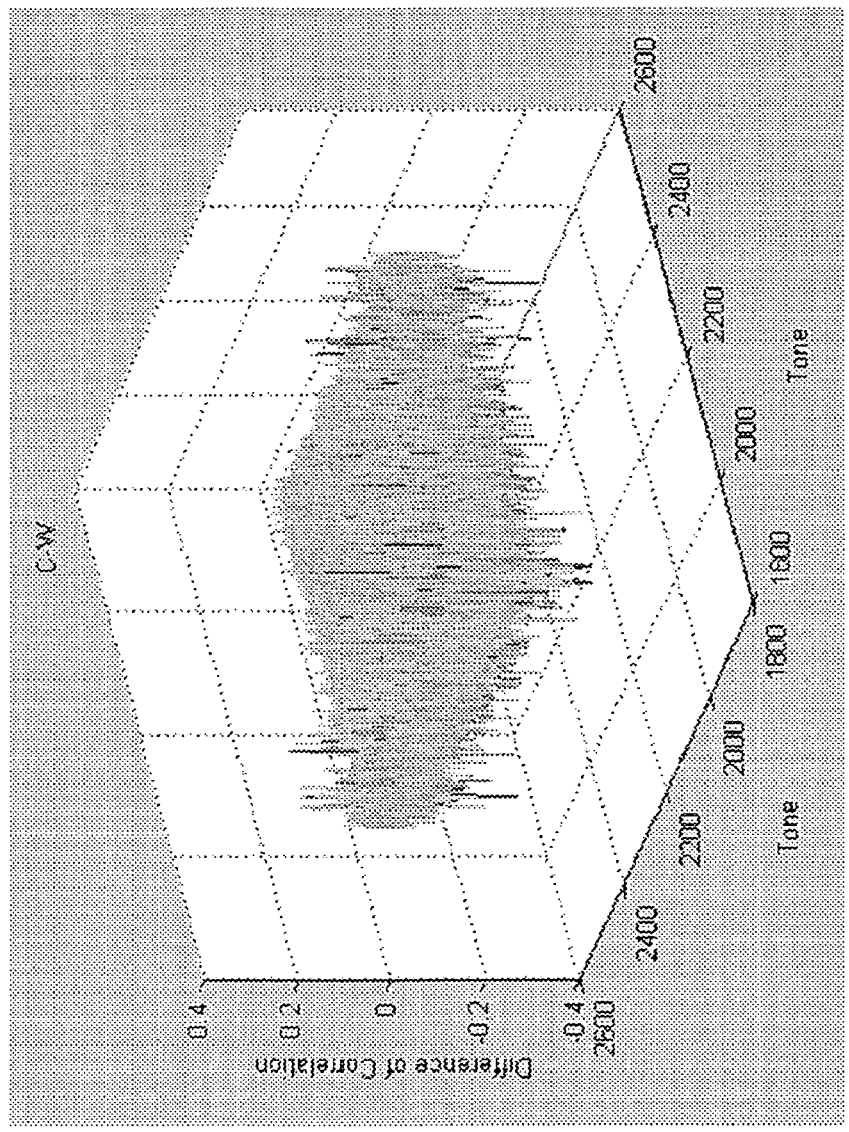
FIG. 13 is a graph of simulation results showing the difference of correlation between cross-talk noise and white noise for tones 1971 to 2500 with half beta equal to 512.
Figure 14:
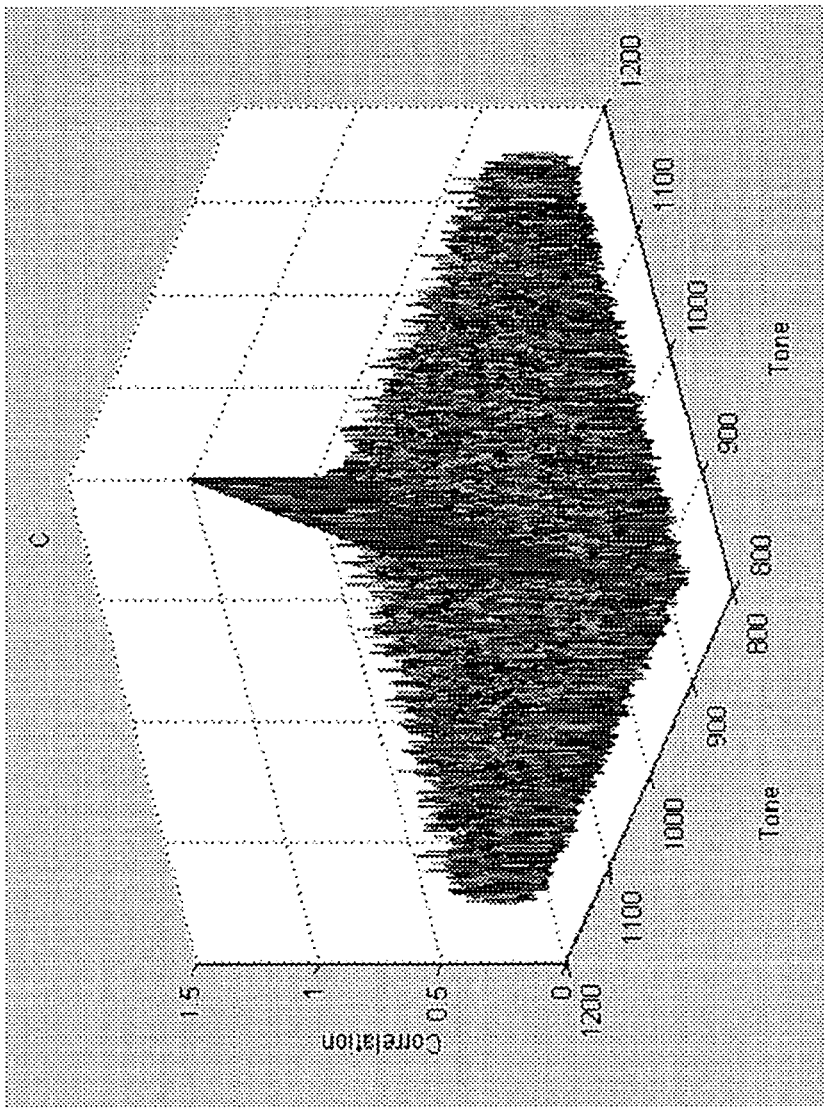
FIG. 14 is a graph of simulation results showing the cross-correlation from tone 870 to 1205 for cross-talk noise with half beta equal to 512.
Figure 15:
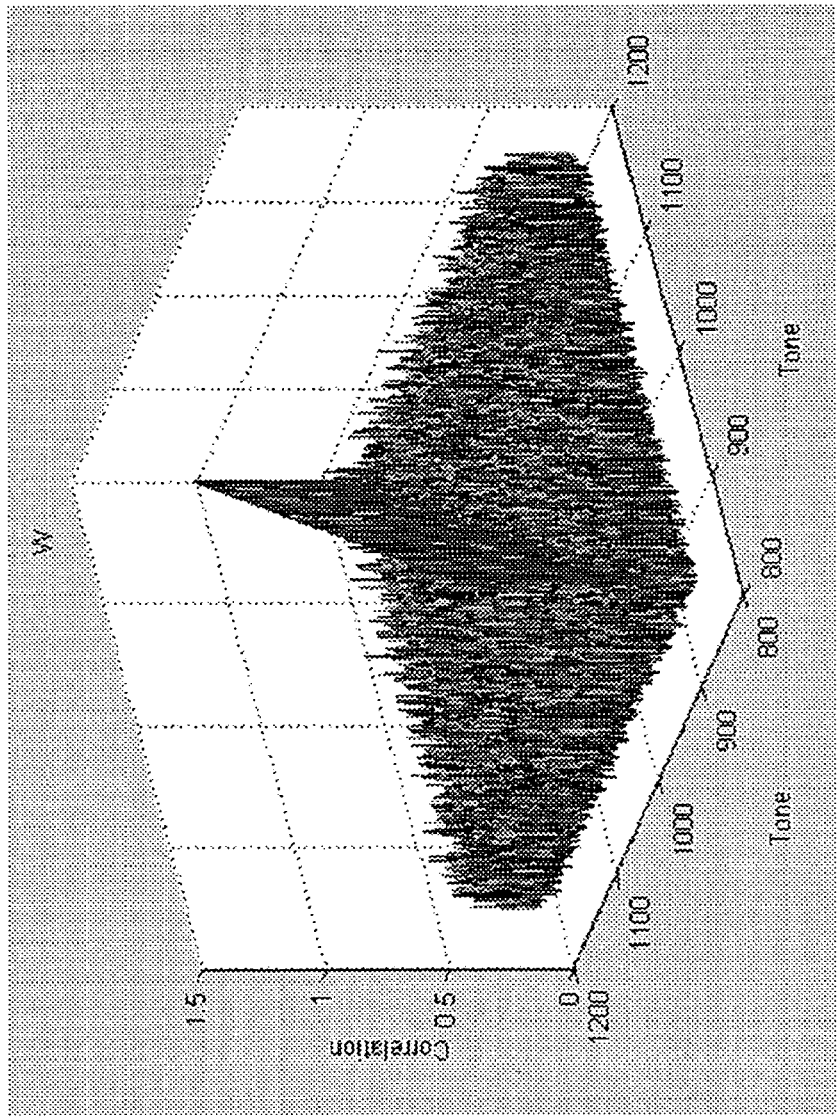
FIG. 15 is a graph of simulation results showing the cross-correlation from tone 870 to 1205 for white noise with half beta equal to 512.
Figure 16:
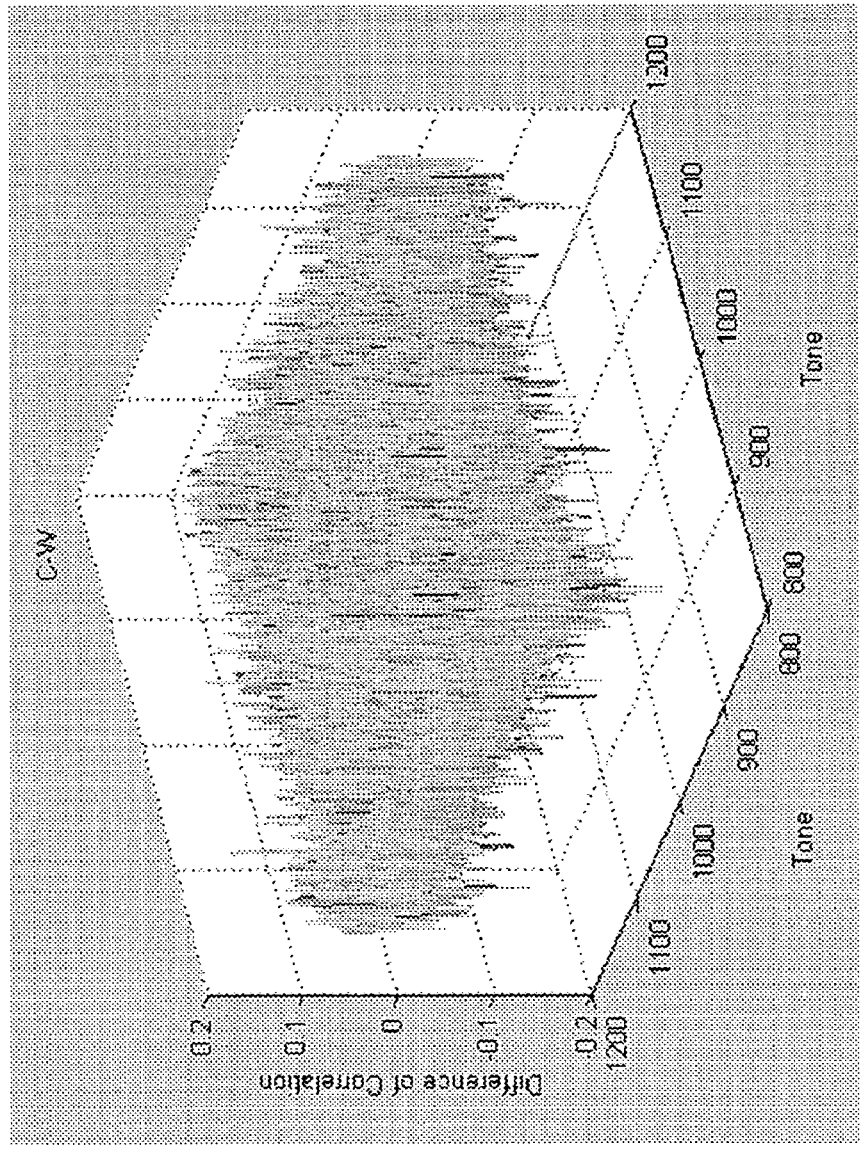
FIG. 16 is a graph of simulation results showing the difference of correlation between cross-talk noise and white noise for tones 870 to 1205 with half beta equal to 512.

FIGS. 11-16 illustrate the second set of simulation results using receive windowing with half beta equal to 512. FIGS. 11 and 12 show the cross-correlation for cross-talk noise and AWGN respectively for tones 1971 to 2500, and FIG. 13 shows the difference of correlation between cross-talk and white noise across the same tones. Similarly, FIGS. 14 and 15 show the cross-correlation for cross-talk noise and AWGN respectively for tones 870 to 1205, and FIG. Windowing helps reduce the correlation at the band edge here as well but a lesser extant due to the shorter windowing.

Figure 17:
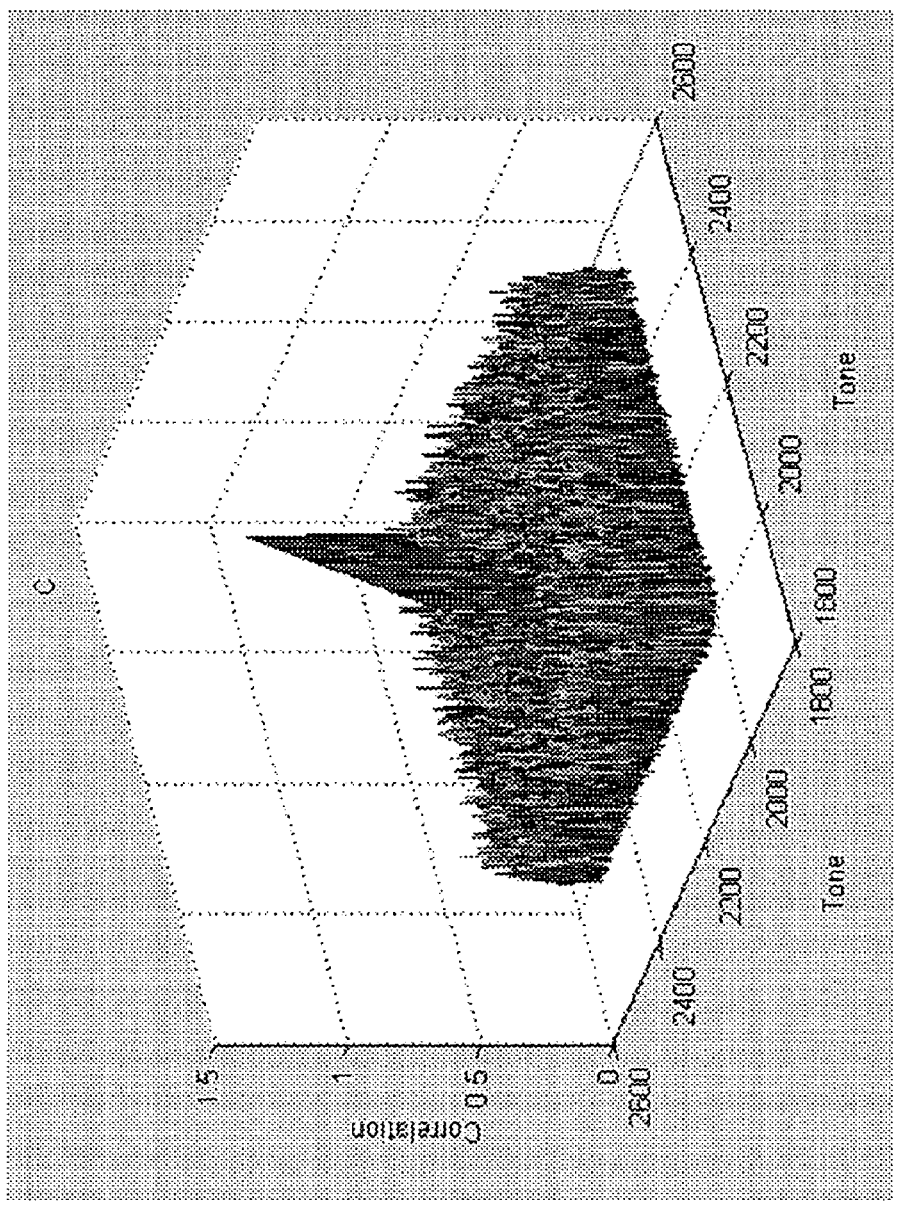
FIG. 17 is a graph of simulation results showing the cross-correlation from tone 1971 to 2500 for cross-talk noise with half beta equal to 256.
Figure 18:
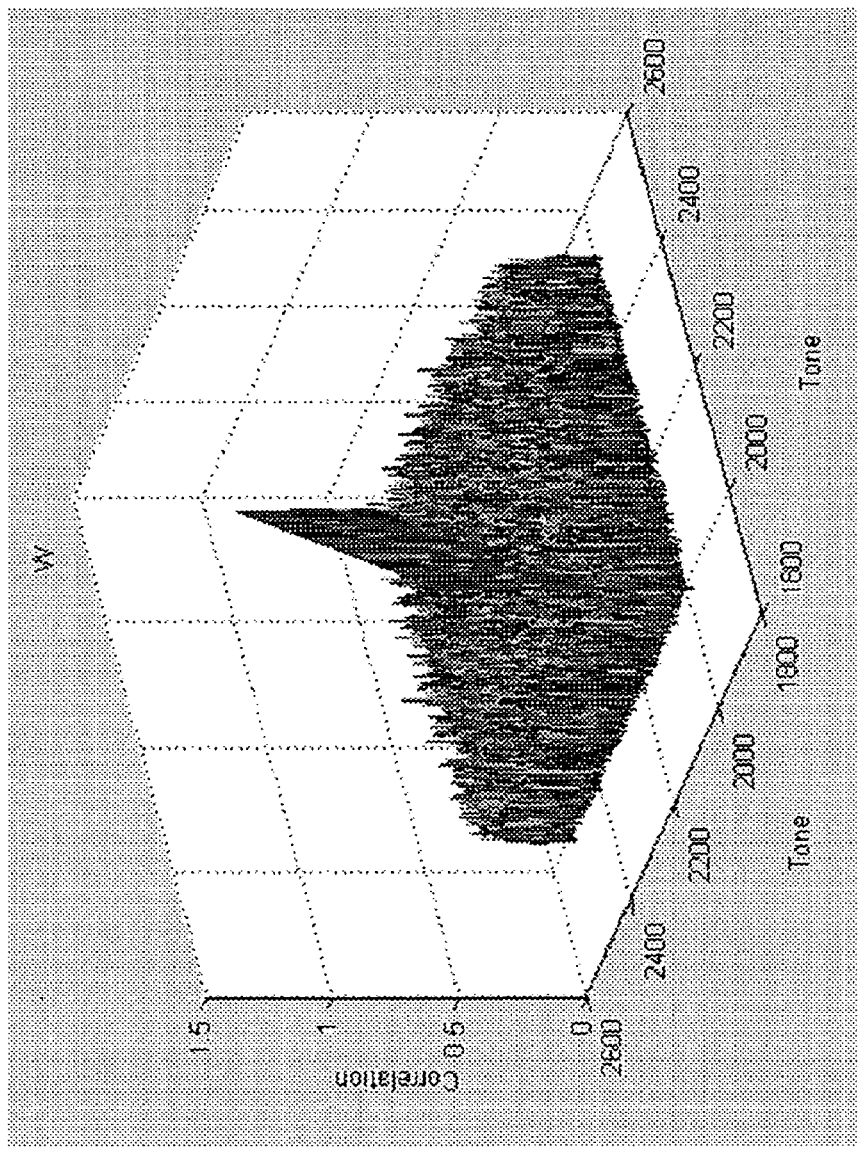
FIG. 18 is a graph of simulation results showing the cross-correlation from tone 1971 to 2500 for white noise with half beta equal to 256.
Figure 19:
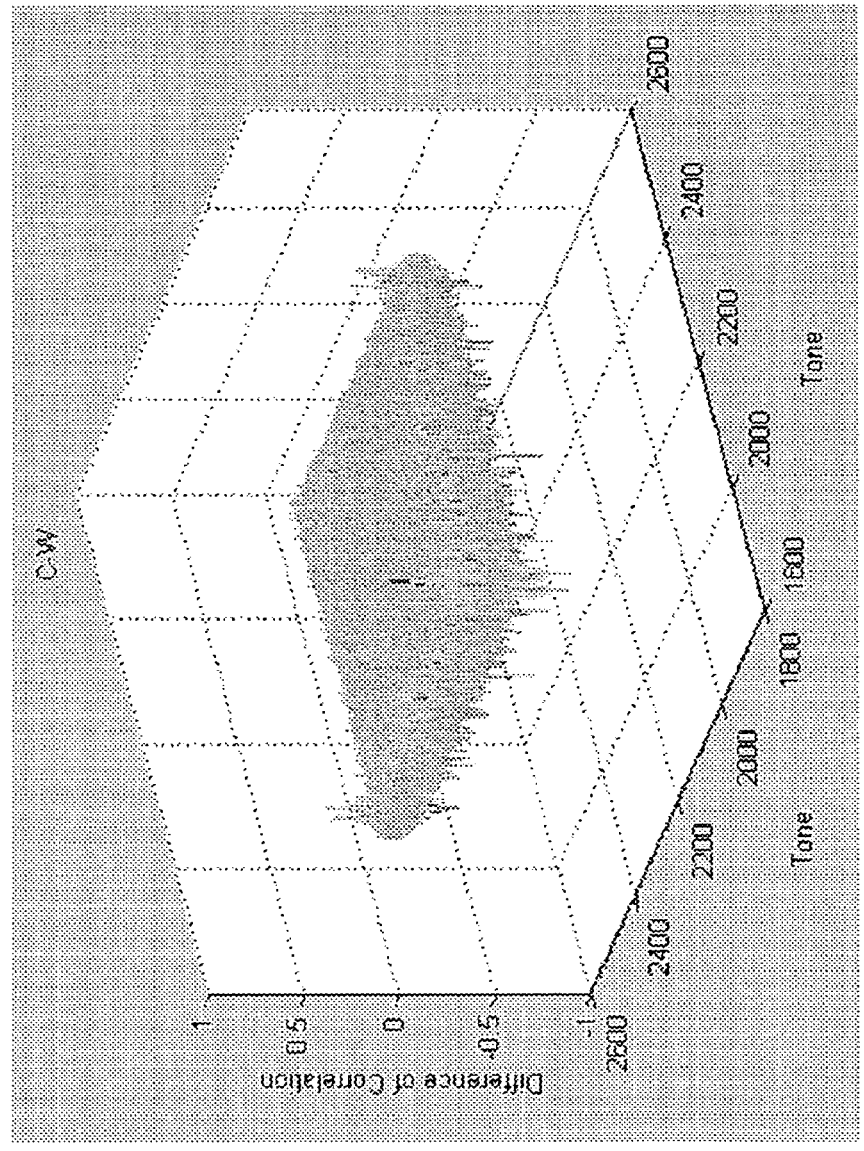
FIG. 19 is a graph of simulation results showing the difference of correlation between cross-talk noise and white noise for tones 1971 to 2500 with half beta equal to 256.
Figure 20:
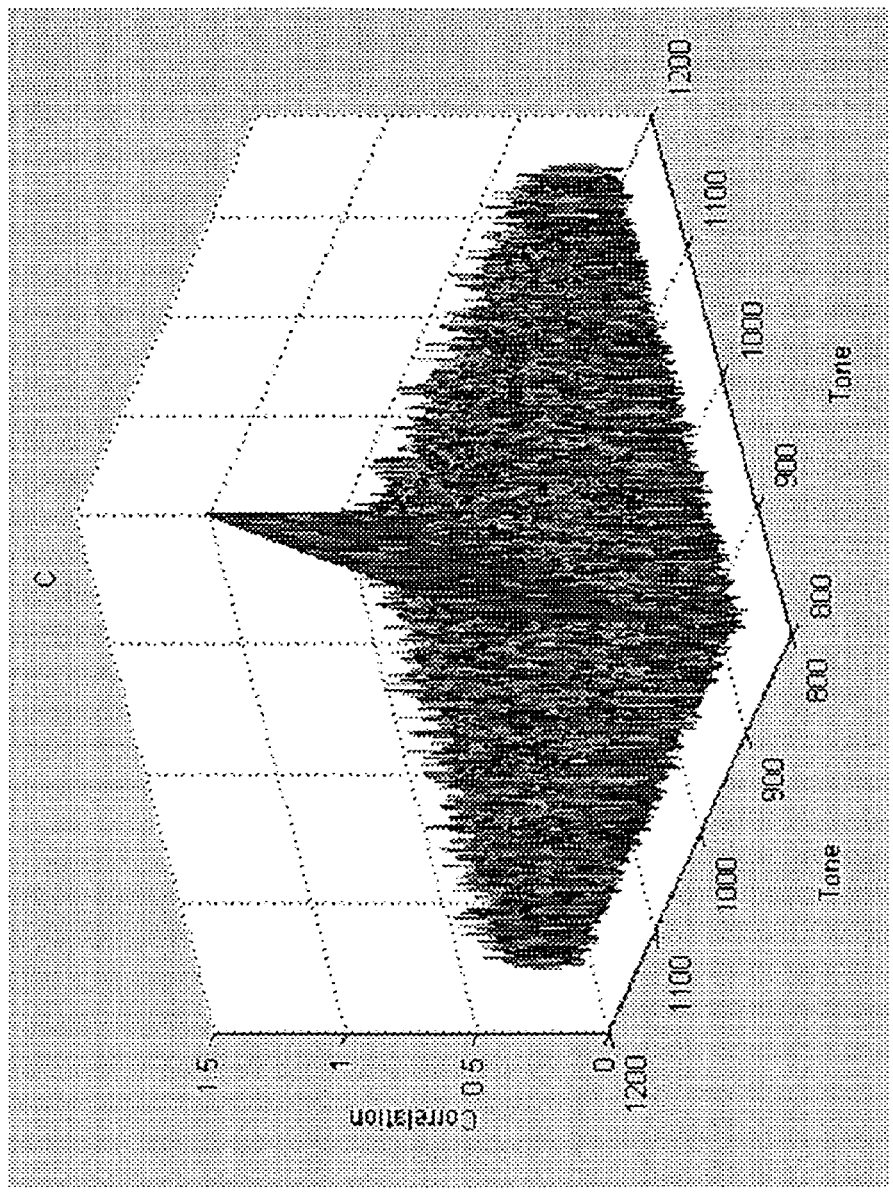
FIG. 20 is a graph of simulation results showing the cross-correlation from tone 870 to 1205 for cross-talk noise with half beta equal to 256.
Figure 21:
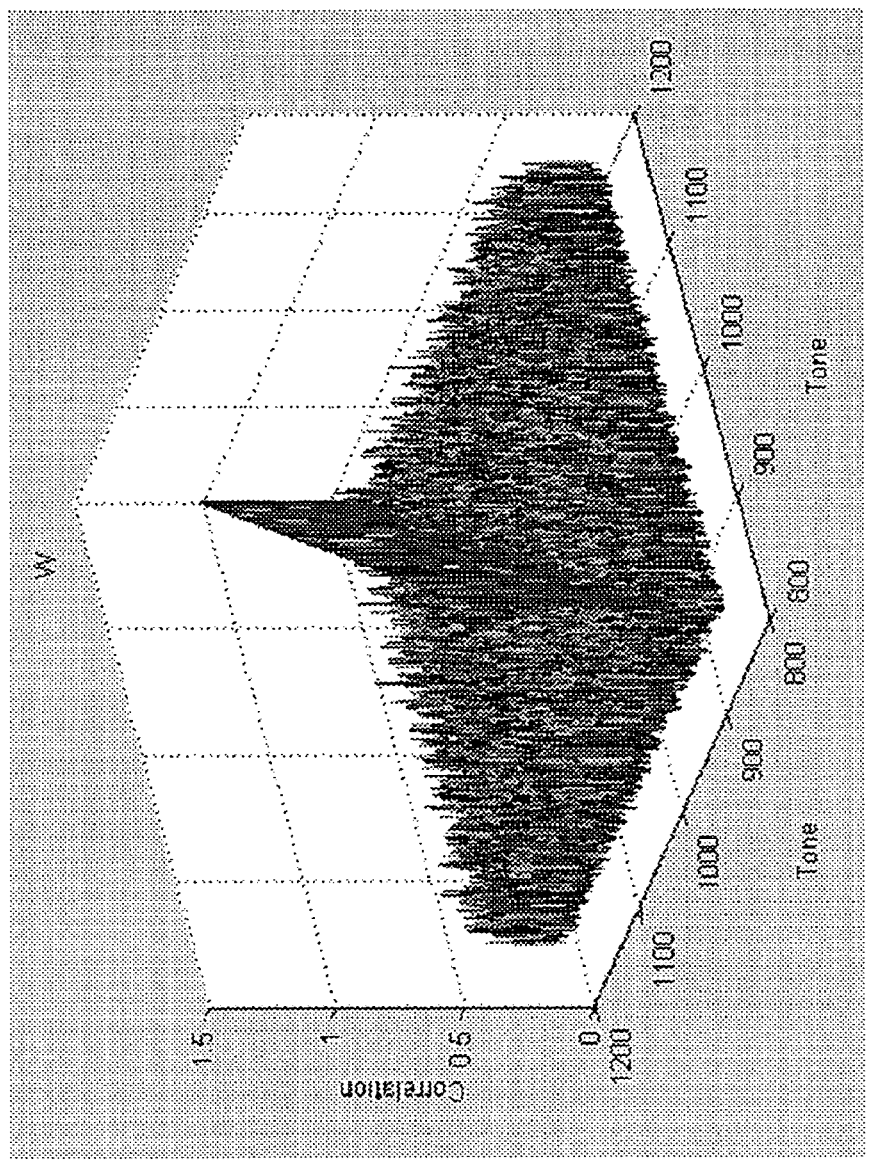
FIG. 21 is a graph of simulation results showing the cross-correlation from tone 870 to 1205 for white noise with half beta equal to 256.
Figure 22:
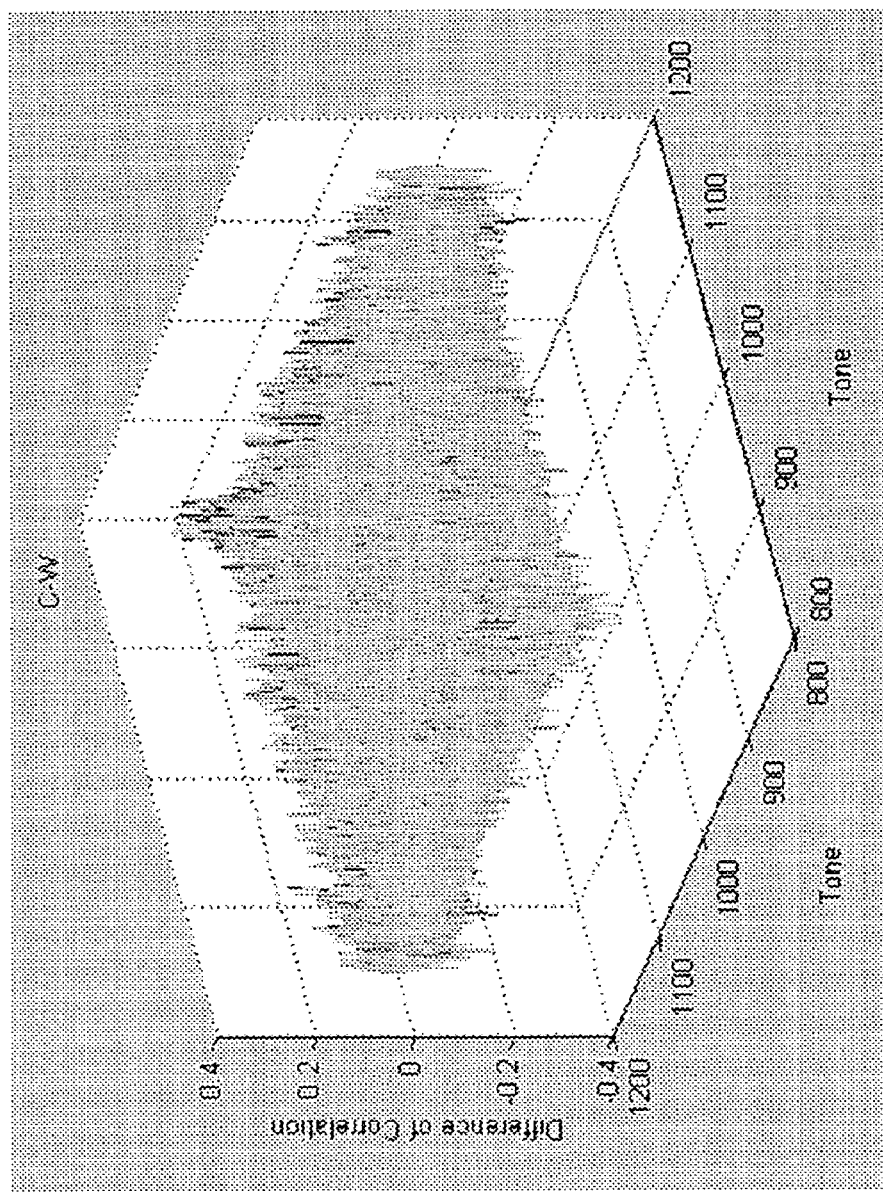
FIG. 22 is a graph of simulation results showing the difference of correlation between cross-talk noise and white noise for tones 870 to 1205 with half beta equal to 256.

FIGS. 17-22 illustrate the third set of simulation results using receive windowing with half beta equal to 256. FIGS. 17 and 18 show the cross-correlation for cross-talk noise and AWGN respectively for tones 1971 to 2500, and FIG. 19 shows the difference of correlation between cross-talk and white noise across the same tones. Similarly, FIGS. 20 and 21 show the cross-correlation for cross-talk noise and AWGN respectively for tones 870 to 1205, and FIG. 22 shows the difference of correlation between cross-talk and white noise across the same tones. Again, the results show that windowing helps reduce the correlation at the band edge.

Figure 23:
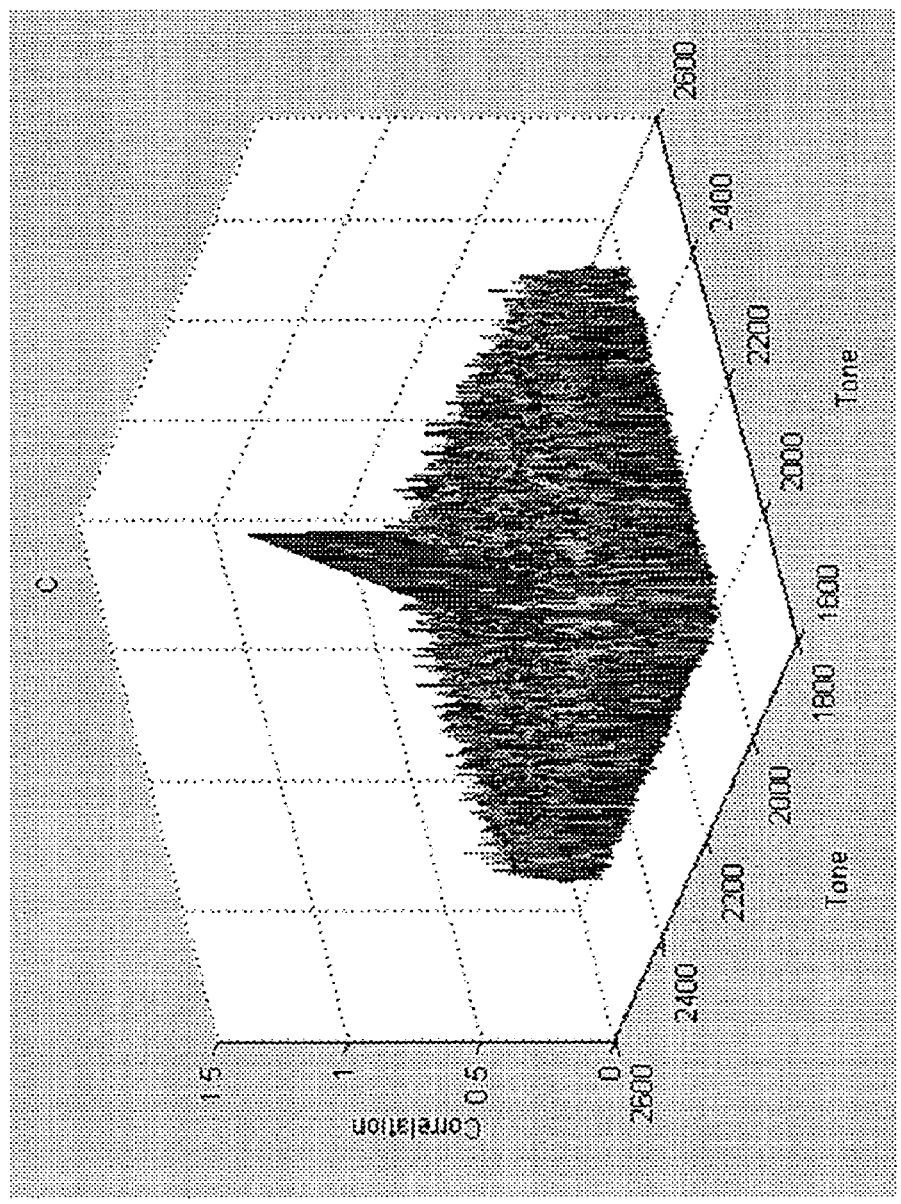
FIG. 23 is a graph of simulation results showing the cross-correlation from tone 1971 to 2500 for cross-talk noise with half beta equal to 128.
Figure 24:
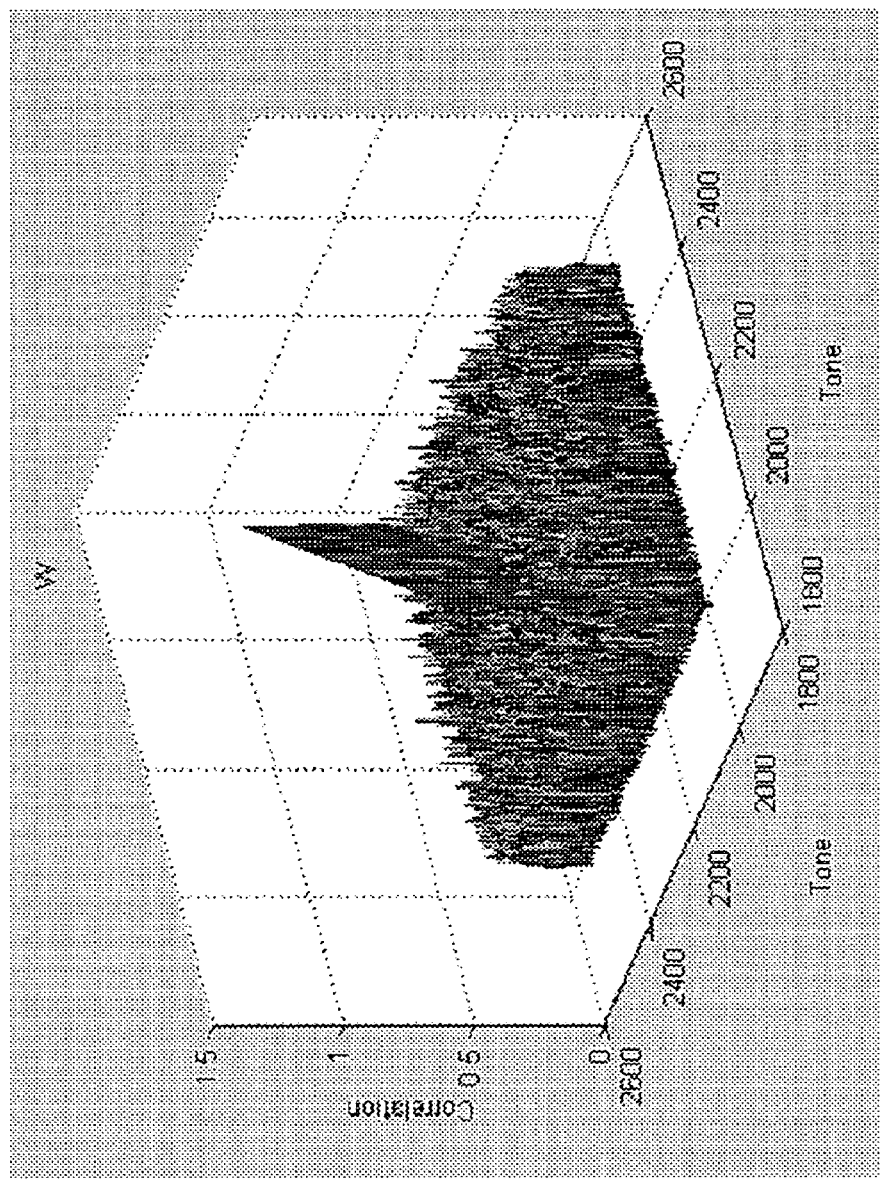
FIG. 24 is a graph of simulation results showing the cross-correlation from tone 1971 to 2500 for white noise with half beta equal to 128.
Figure 25:
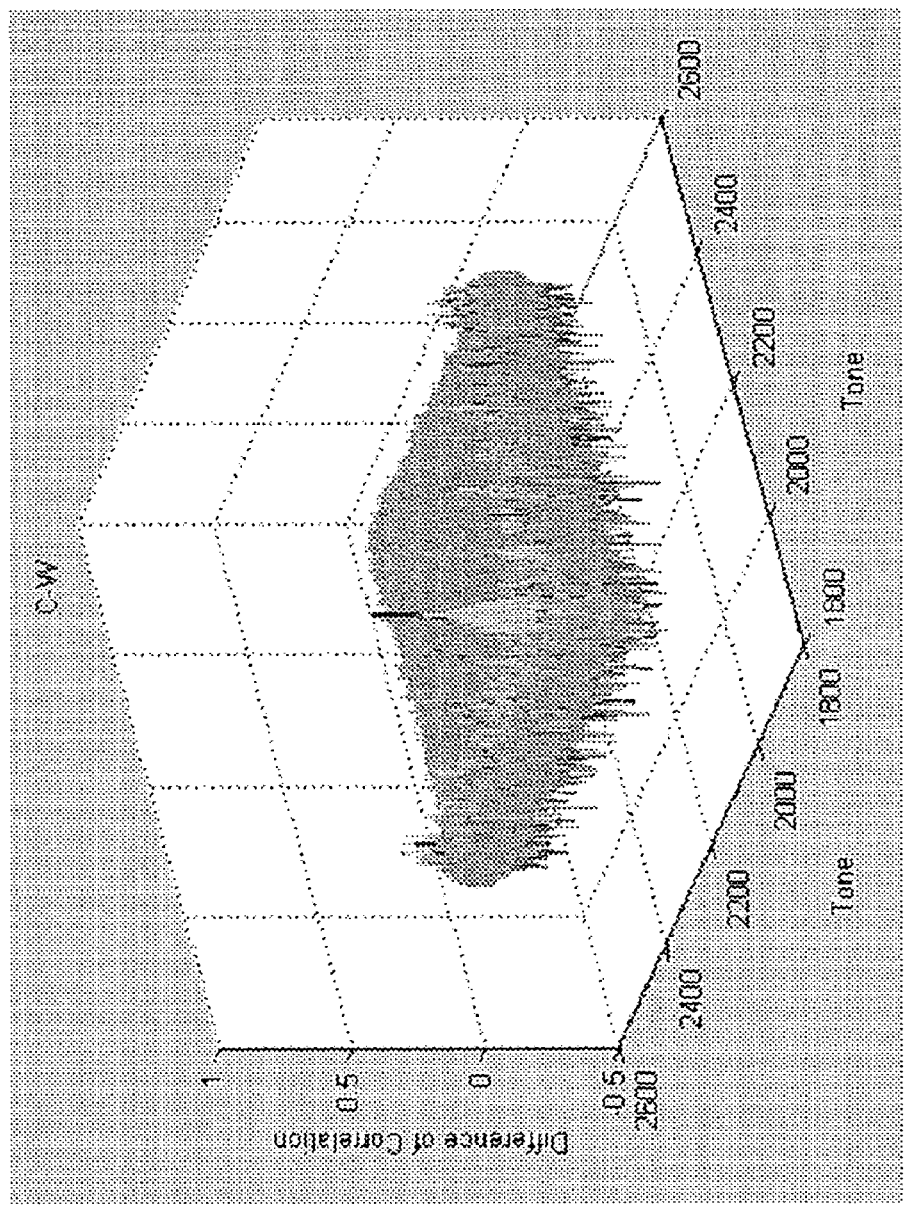
FIG. 25 is a graph of simulation results showing the difference of correlation between cross-talk noise and white noise for tones 1971 to 2500 with half beta equal to 128.
Figure 26:
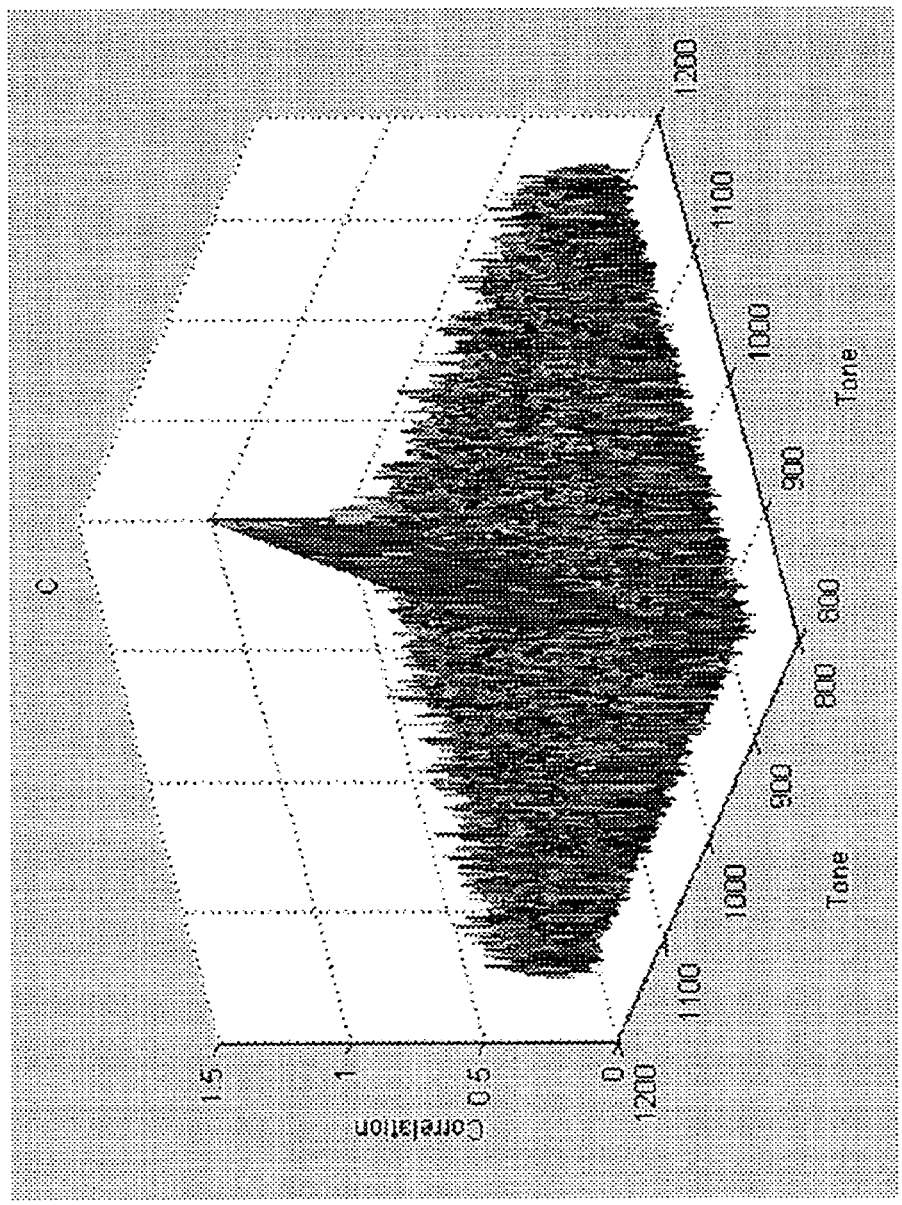
FIG. 26 is a graph of simulation results showing the cross-correlation from tone 870 to 1205 for cross-talk noise with half beta equal to 128.
Figure 27:
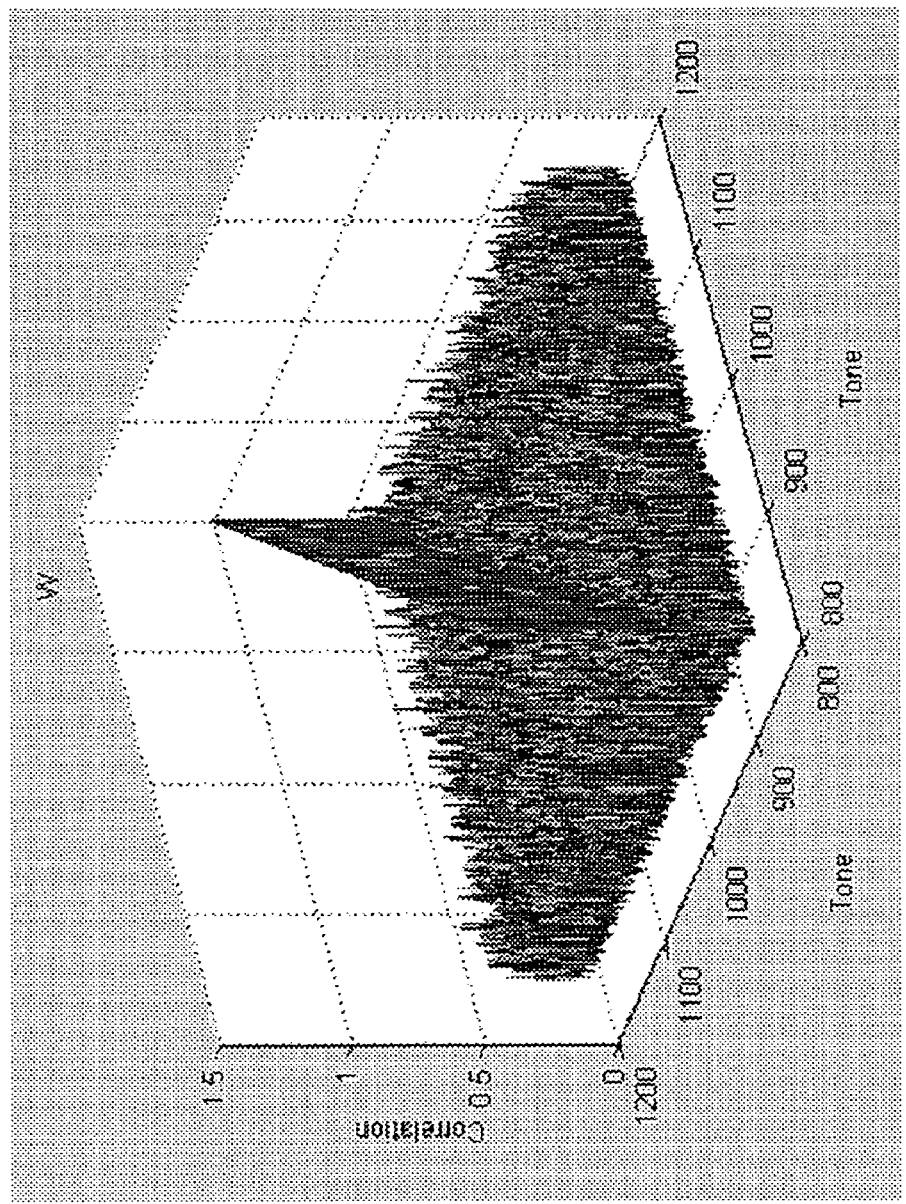
FIG. 27 is a graph of simulation results showing the cross-correlation from tone 870 to 1205 for white noise with half beta equal to 128.
Figure 28:
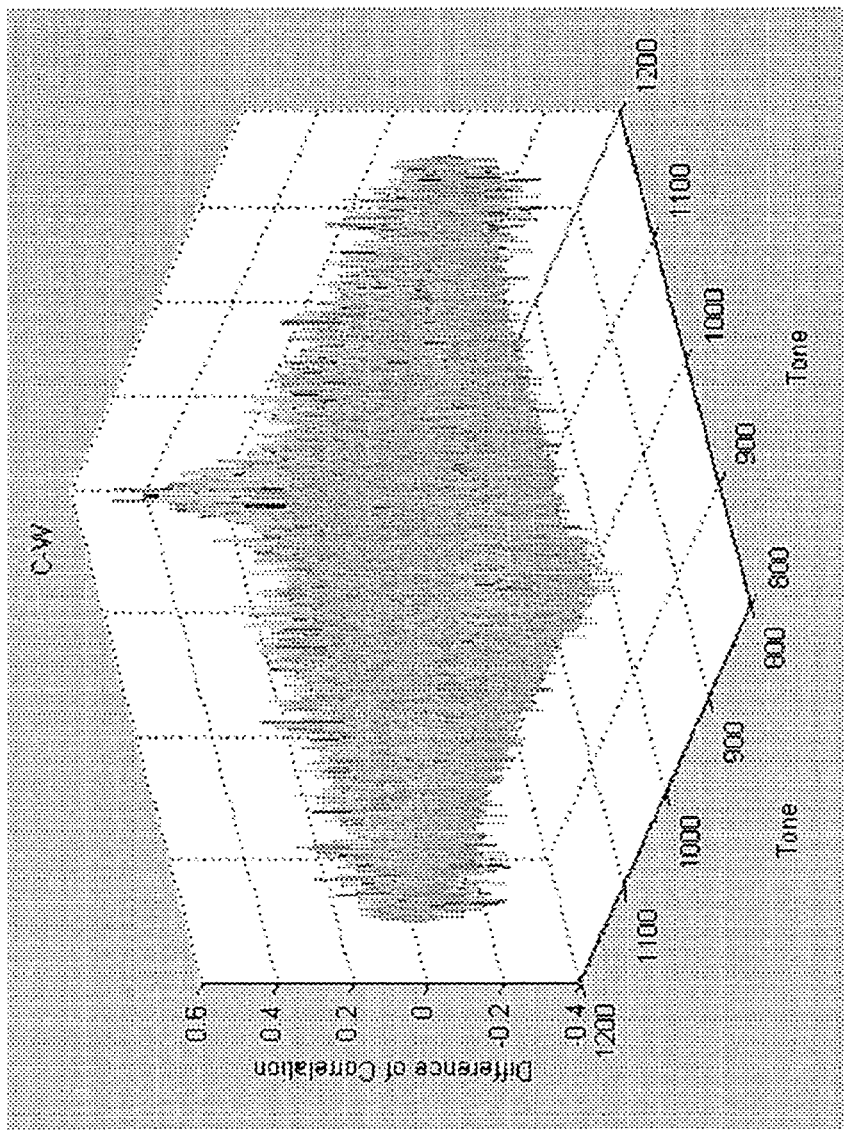
FIG. 28 is a graph of simulation results showing the difference of correlation between cross-talk noise and white noise for tones 870 to 1205 with half beta equal to 128.

FIGS. 23-28 illustrate the fourth set of simulation results using receive windowing with half beta equal to 128. FIGS. 23 and 24 show the cross-correlation for cross-talk noise and AWGN respectively for tones 1971 to 2500, and FIG. 25 shows the difference of correlation between cross-talk and white noise across the same tones. Similarly, FIGS. 26 and 27 show the cross-correlation for cross-talk noise and AWGN respectively for tones 870 to 1205, and FIG. 28 shows the difference of correlation between cross-talk and white noise across the same tones. Here windowing has reduced the correlation at the band edges but to an lesser degree than with half-beta at 256 or 512.

Figure 29:
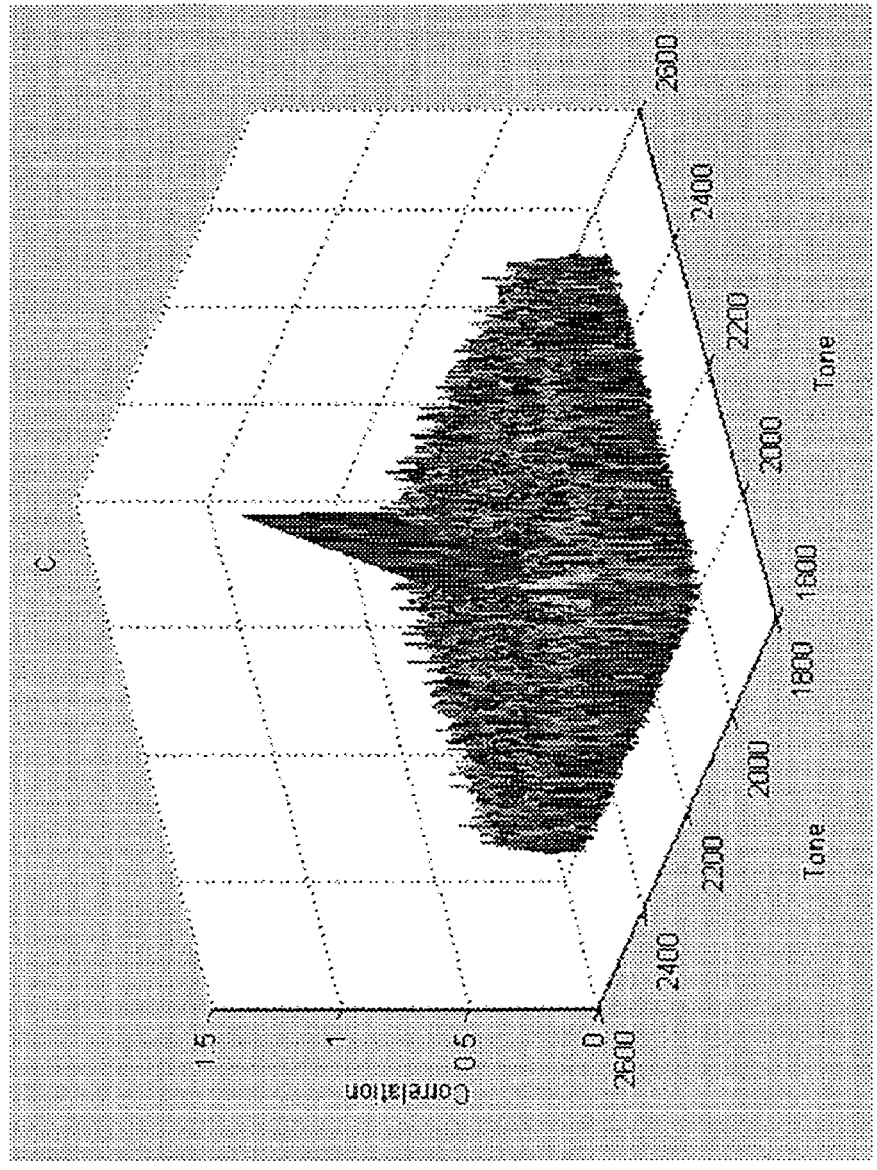
FIG. 29 is a graph of simulation results showing the cross-correlation from tone 1971 to 2500 for cross-talk noise with half beta equal to 64.
Figure 30:
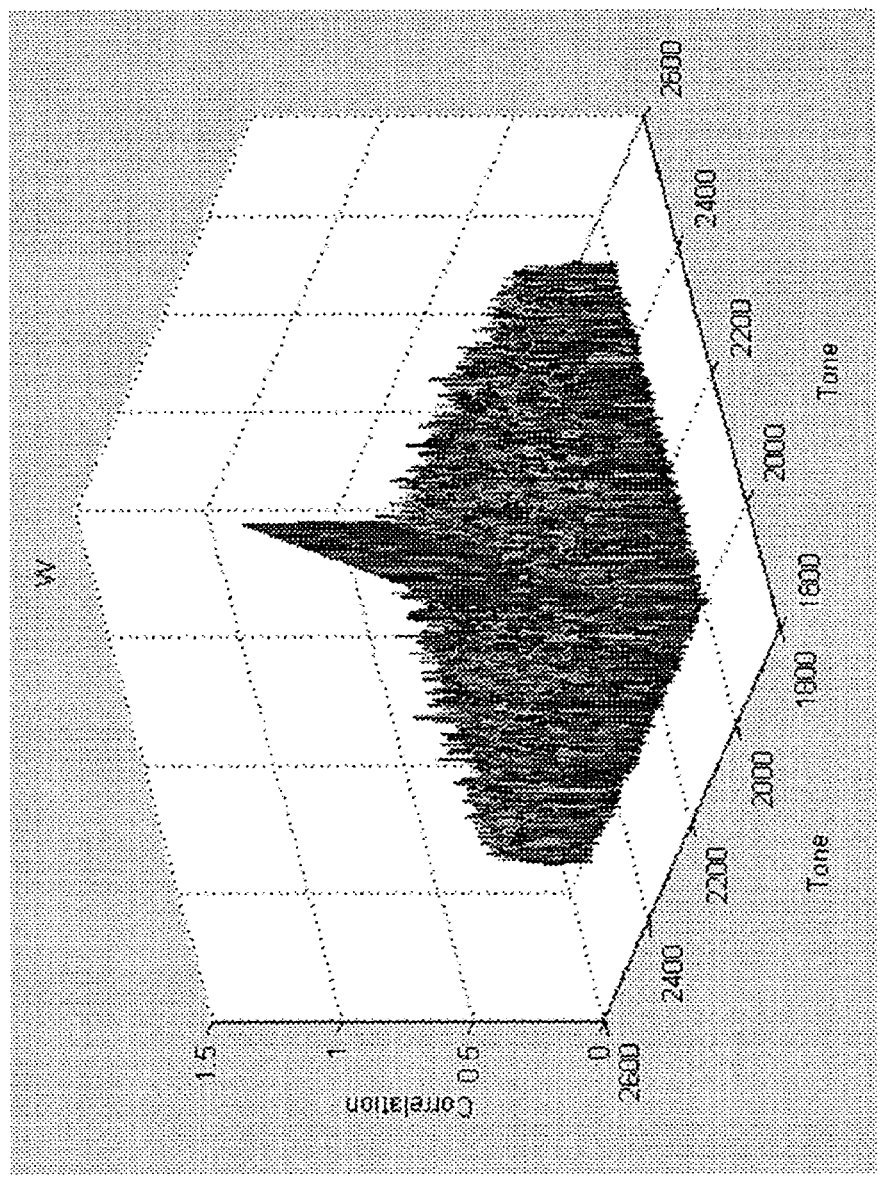
FIG. 30 is a graph of simulation results showing the cross-correlation from tone 1971 to 2500 for white noise with half beta equal to 64.
Figure 31:
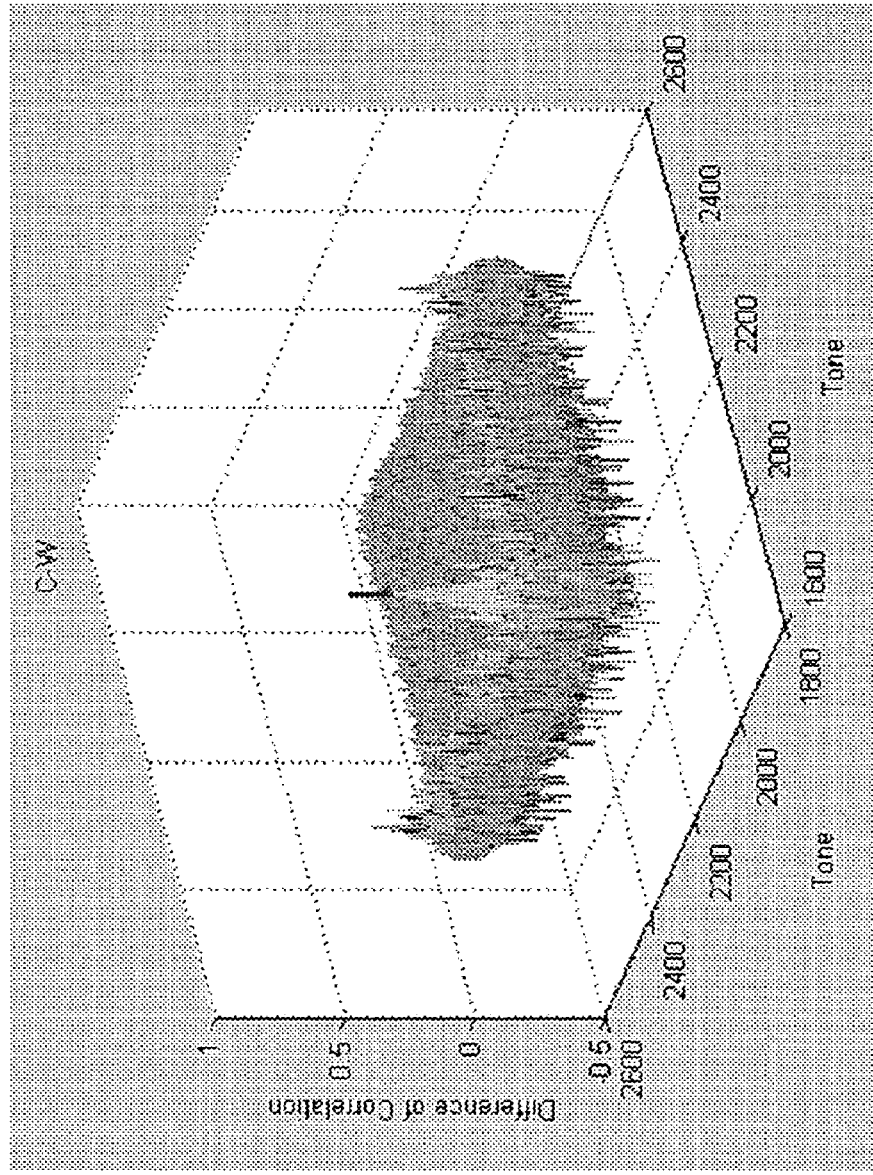
FIG. 31 is a graph of simulation results showing the difference of correlation between cross-talk noise and white noise for tones 1971 to 2500 with half beta equal to 64.
Figure 32:
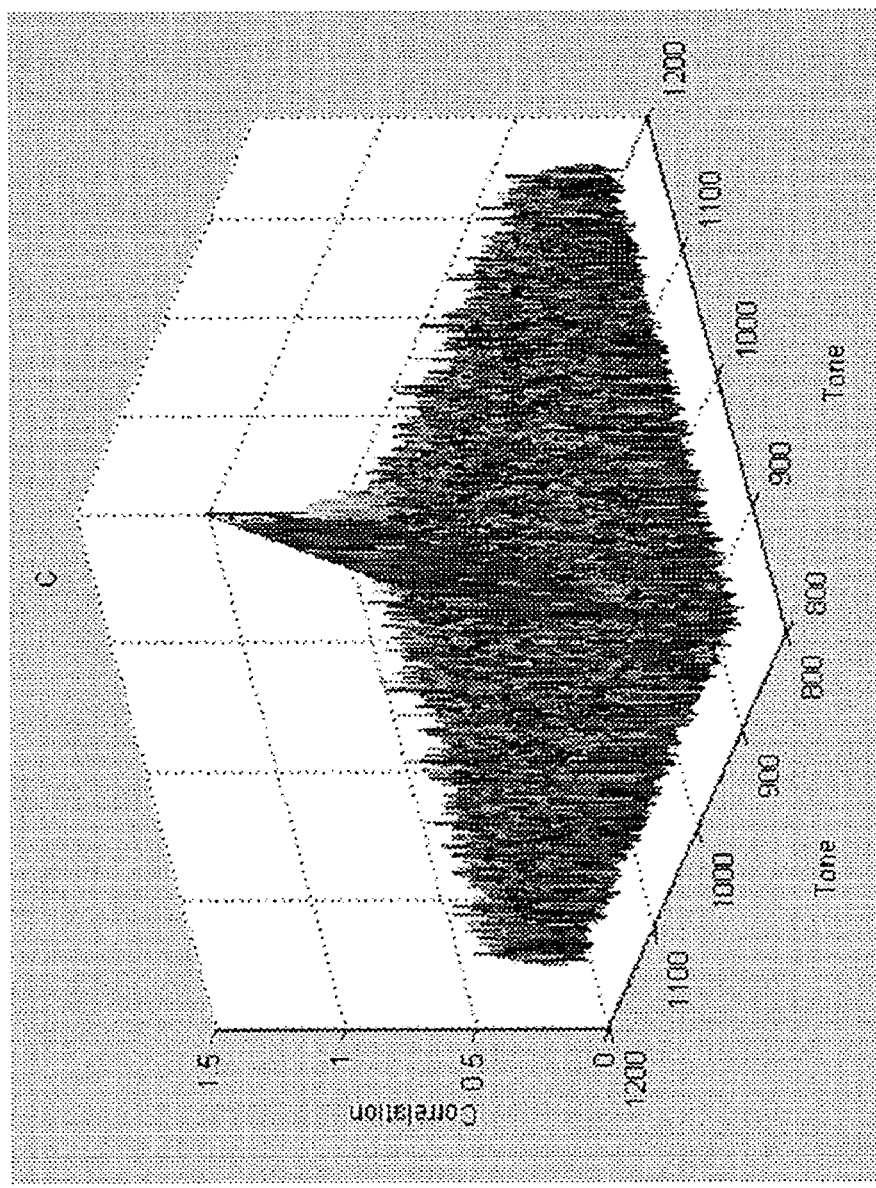
FIG. 32 is a graph of simulation results showing the cross-correlation from tone 870 to 1205 for cross-talk noise with half beta equal to 64.
Figure 33:
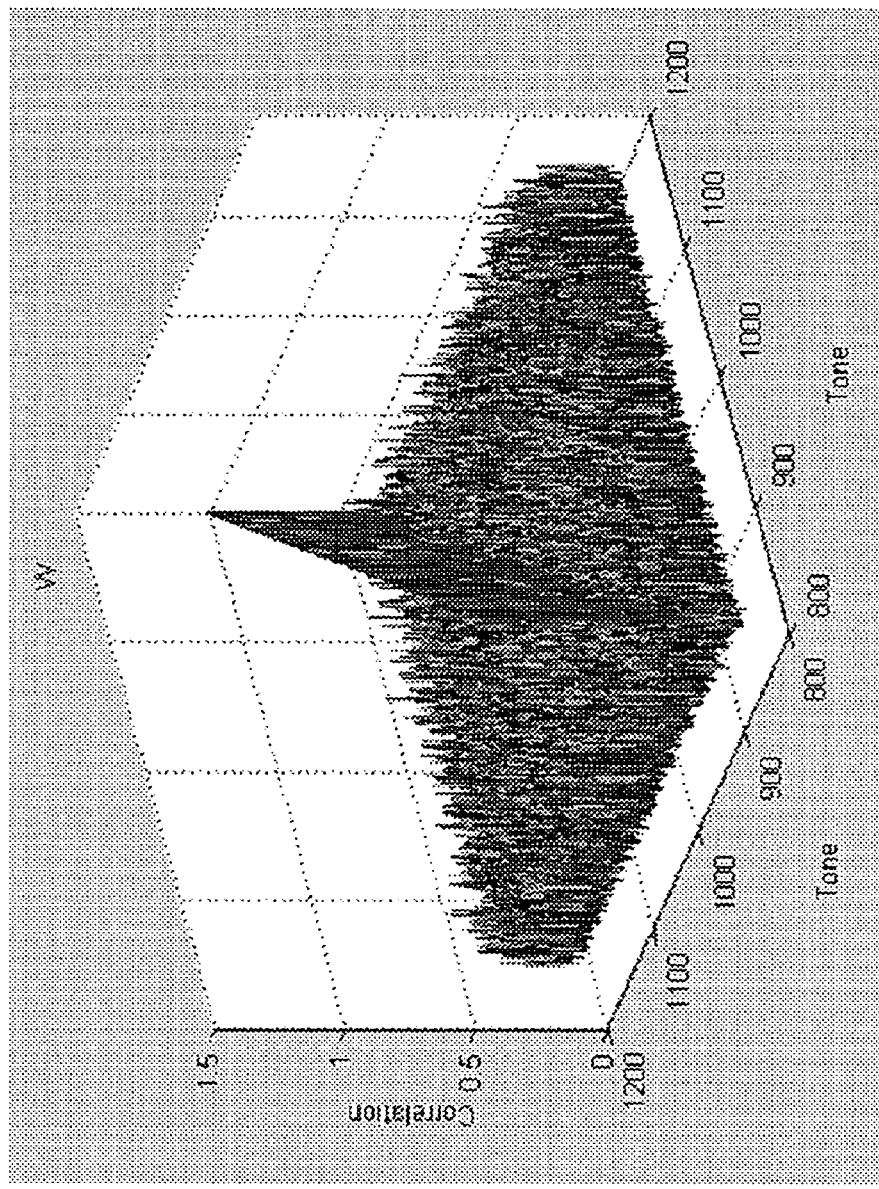
FIG. 33 is a graph of simulation results showing the cross-correlation from tone 870 to 1205 for white noise with half beta equal to 64.
Figure 34:
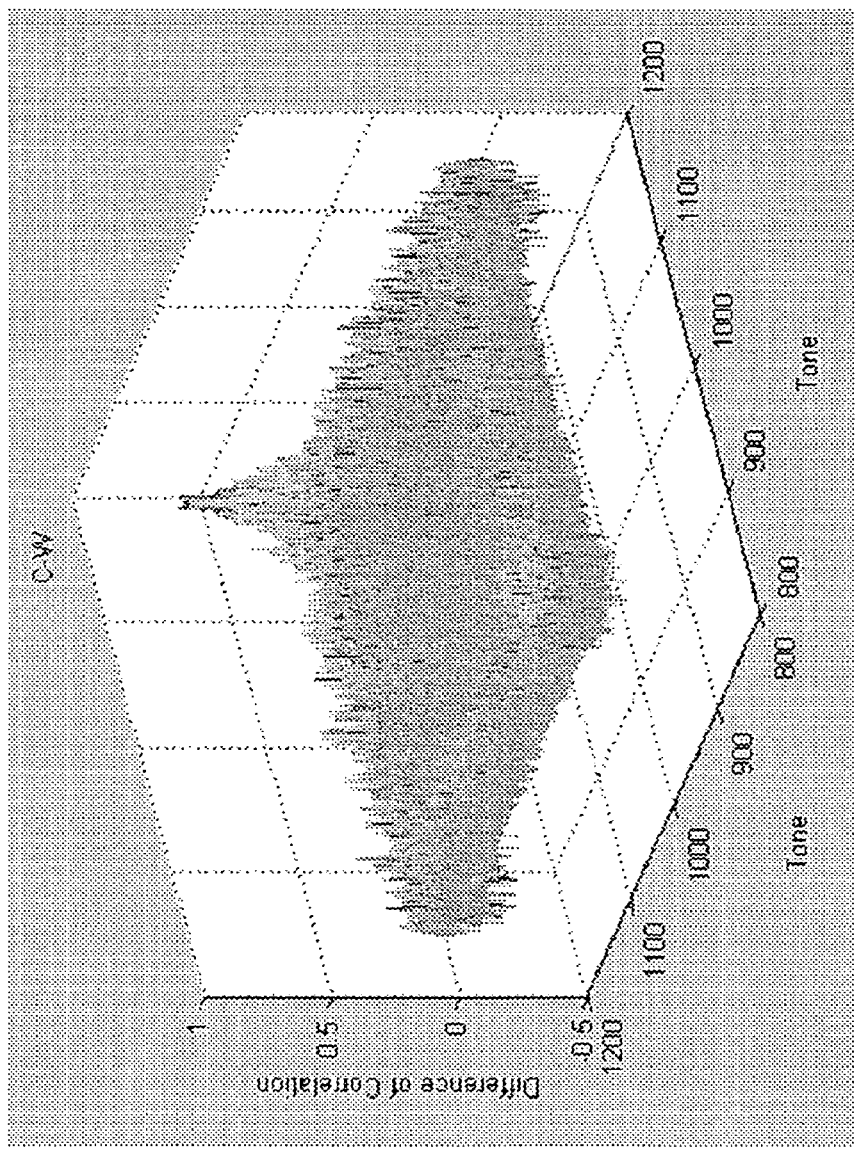
FIG. 34 is a graph of simulation results showing the difference of correlation between cross-talk noise and white noise for tones 870 to 1205 with half beta equal to 64.

FIGS. 29-34 illustrate the fifth set of simulation results using receive windowing with half beta equal to 64. FIGS. 29 and 30 show the cross-correlation for cross-talk noise and AWGN respectively for tones 1971 to 2500, and FIG. 31 shows the difference of correlation between cross-talk and white noise across the same tones. Similarly, FIGS. 32 and 33 show the cross-correlation for cross-talk noise and AWGN respectively for tones 870 to 1205, and FIG. 34 shows the difference of correlation between cross-talk and white noise across the same tones. Again windowing has reduced the correlation at the band edges but to an lesser degree than with half-beta at 128, 256 or 512.

Various embodiments of this invention may be implemented in FDPs (Frequency-Domain Processor) for VDSL (Very High Speed Digital Subscriber Line) products as well as in other DMT-based xDSL systems.

The embodiments of the present inventions are not to be limited in scope by the specific embodiments described herein. For example, although many of the embodiments disclosed herein have been described with reference reducing SNR margin between fast and interleaved channels in a dual latency DMT-based xDSL communication system, the principles herein are equally applicable to other aspects of multiple latency systems. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A method of resolving a signal-to-noise (SNR) margin difference between fast and interleaved channels in a dual latency discrete multi-tone (DMT)-based digital subscriber line (DSL) communication system comprising:
dividing a communication channel into a plurality of equal bandwidth sub-channels;
determining the transmission characteristics of each sub-channel;
establishing two data paths from the sub-channels, wherein the data paths have different target SNR margins;
allocating data having a relatively higher SNR margin near band edges between upstream and downstream data bands on the communication channel and allocating data having a relatively lower SNR margin away from these band edges, wherein establishing two data paths from the sub-channels comprises establishing at least a relatively fast data path and a relatively slower data path, wherein establishing a relatively fast data path comprises establishing a data path having a relatively higher bit error rate than the relatively slower data path, wherein data to be transferred over the relatively slower data path is allocated to tones near the band edge; and
backing off a pre-determined number of tones at the band edges in the data path having the relatively higher bit error rate.

2. The method according to claim 1, further comprising simultaneously transferring bits of data over the two data paths.

3. The method according to claim 1, wherein establishing a relatively slower data path comprises establishing a data path comprising at least one forward error correction (FEC) technique selected from the group consisting of Reed-Solomon coding, interleaving, and Trellis coding.

4. The method according to claim 3, wherein establishing a relatively fast data path and a relatively slower data path comprises establishing data paths having different coding gains, wherein the sub-channels on the relatively slower data path have a higher coding gain than sub-channels on the relatively fast data path.

5. The method according to claim 3, wherein the establishing a relatively fast data path and a relatively slower data path comprises applying different target noise margins to sub-channels carrying different latency paths.

6. The method according to claim 3, wherein data corresponding to error sensitive applications is transferred over the relatively slower data path.

7. The method according to claim 6, wherein data corresponding to latency sensitive application is transferred over the relatively faster data path.

8. The method according to claim 1, further comprising performing receive windowing on data received over the received data from both paths.

9. The method according to claim 8, wherein performing receive windowing comprises performing windowing with a window half beta=512.

10. The method according to claim 8, wherein performing receive windowing comprises performing windowing with a window half beta=256.

11. The method according to claim 8, wherein performing receive windowing comprises performing windowing with a window half beta=128.

12. The method according to claim 8, wherein performing receive windowing comprises performing windowing with a window half beta=64.

13. A method of reducing performance variation between fast and interleaved data paths in a dual latency discrete multi-tone (DMT)-based digital subscriber line (DSL) system comprising:
dividing a communication channel into a plurality of equal bandwidth tones;
allocating the plurality of tones into fast and interleaved data paths;
determining band edges between upstream and downstream data bands on the communication channel that are vulnerable to colored, non-constant noise; and
allocating tones in the fast data path away from the band edges, wherein allocating the plurality of tones into fast and interleaved data paths comprises establishing a data path having a relatively higher bit error rate than a relatively slower data path, wherein data to be transferred over the relatively slower data path is allocated to tones near the band edge; and
backing off a pre-determined number of tones at the band edges in the data path having the relatively higher bit error rate.

14. The method according to claim 13, further comprising performing a receive windowing function on data transmitted on the fast and interleaved data paths.

15. A chipset for a digital subscriber line (DSL) transceiver comprising:
   circuitry adapted to determined conditions of a communication line between a customers premises and a central office;
   circuitry adapted to divide the communication line into a plurality of equal bandwidth sub-channels;
   circuitry adapted to allocate the plurality of equal bandwidth sub-channels into first and second parallel data paths, wherein the first data path is characterized as a being a relatively faster data path and the second data paths is characterize as being an interleaved data path such that the relatively fast data path has a relatively higher bit error rate than the second data path, wherein data to be transferred over the second data path is allocated to tones near the band edge;
   circuitry adapted to determine band edges between upstream and downstream data bands on the communication channel that are vulnerable to colored noise; and
   circuitry adapted to allocate data onto sub-carriers in the relatively faster data path away from the band edges; and
   circuitry adapted to back off a pre-determined number of tones at the band edges in the data path having the relatively higher bit error rate.

16. The chipset according to claim 15, further comprising circuitry adapted to perform a windowing function on data received over the two parallel data paths.

\* \* \* \* \*

UNITED STATES PATENT AND TRADEMARK OFFICE
CERTIFICATE OF CORRECTION

PATENT NO. : 7,907,658 B2  Page 1 of 1
APPLICATION NO. : 11/513096
DATED : March 15, 2011
INVENTOR(S) : Tung et al.

It is certified that error appears in the above-identified patent and that said Letters Patent is hereby corrected as shown below:

Column 15, line 3: delete "determined" and replace with --determine--

Signed and Sealed this
First Day of November, 2011

David J. Kappos
*Director of the United States Patent and Trademark Office*